(12) United States Patent
Garfunkel et al.

(10) Patent No.: US 6,430,011 B1
(45) Date of Patent: Aug. 6, 2002

(54) READ HEAD WITH IMPROVED LEAD LAYERS AT AN AIR BEARING SURFACE

(75) Inventors: Glen Adam Garfunkel; Wen Chien David Hsiao; Edward Hinpong Lee, all of San Jose; Douglas Johnson Werner, Fremont, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,055

(22) Filed: Apr. 21, 2000

Related U.S. Application Data

(62) Division of application No. 09/176,387, filed on Oct. 21, 1998, now Pat. No. 6,085,406.

(51) Int. Cl.$^7$ ................................................. G11B 5/39
(52) U.S. Cl. .................................................... 360/322
(58) Field of Search ........................................ 360/322

(56) References Cited

U.S. PATENT DOCUMENTS

| | | | |
|---|---|---|---|
| 5,212,609 A | * 5/1993 | Yuito et al. ................... 216/22 |
| 5,539,598 A | 7/1996 | Denison et al. ............. 360/113 |
| 5,807,636 A | * 9/1998 | Shuji et al. ............... 29/603.14 |
| 5,992,004 A | * 11/1999 | Sato et al. ................ 29/603.14 |
| 6,160,687 A | 12/2000 | Pinarbasi ..................... 360/322 |
| 6,209,193 B1 | 4/2001 | Hsiao ....................... 29/603.15 |

\* cited by examiner

Primary Examiner—George J. Letscher
(74) Attorney, Agent, or Firm—Ervin F. Johnston

(57) ABSTRACT

The present invention extends the high resistance lead layers of a read head straight back into the head from each of the first and second edges of the read sensor. This lessens the length of each of the high resistance lead layers so that they do not have to be made thicker to satisfy resistance requirements. Accordingly, a lateral width of each high resistance lead portion along the ABS and a thickness thereof are chosen so as to minimize the thickness while yet satisfying the resistance requirements. Further, a method of making the first and second lead layers is provided that minimizes the thickness of the high resistance lead layers. Instead of constructing the high resistance lead layers first, the present method constructs the high resistance lead layers last so that the high resistance lead layers are not altered by subsequent processing steps.

12 Claims, 22 Drawing Sheets

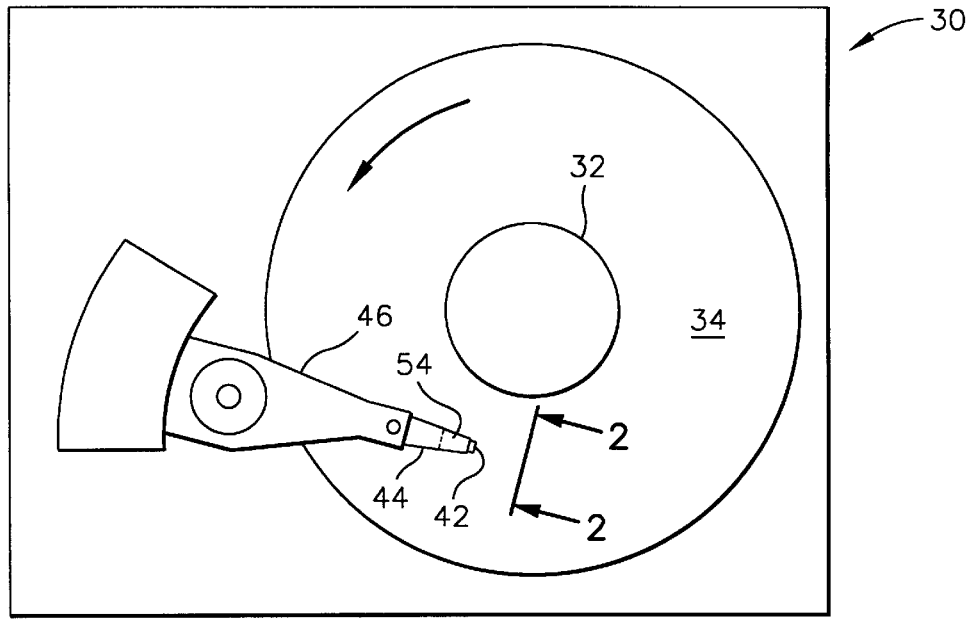
FIG. 1
FIG. 2
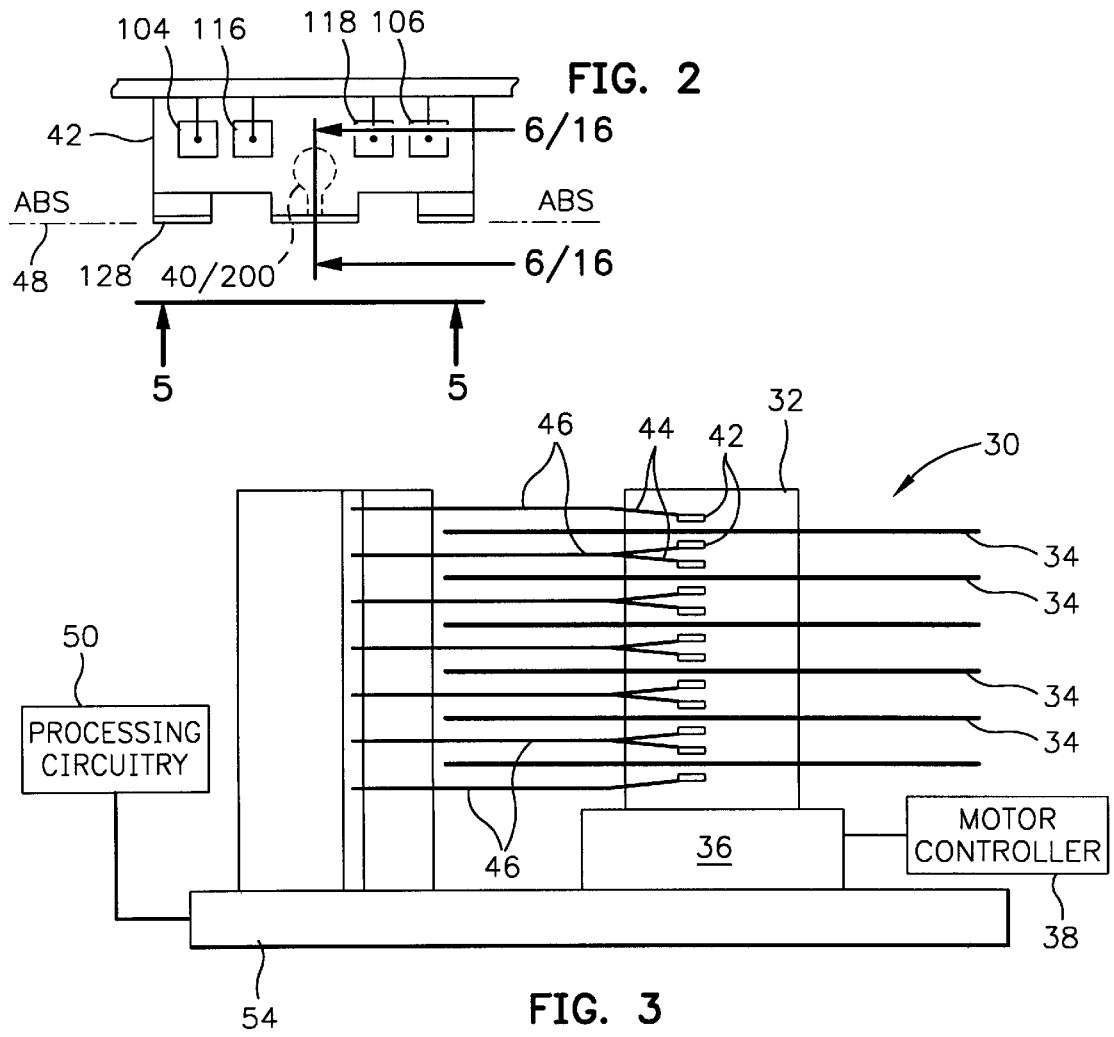
FIG. 3

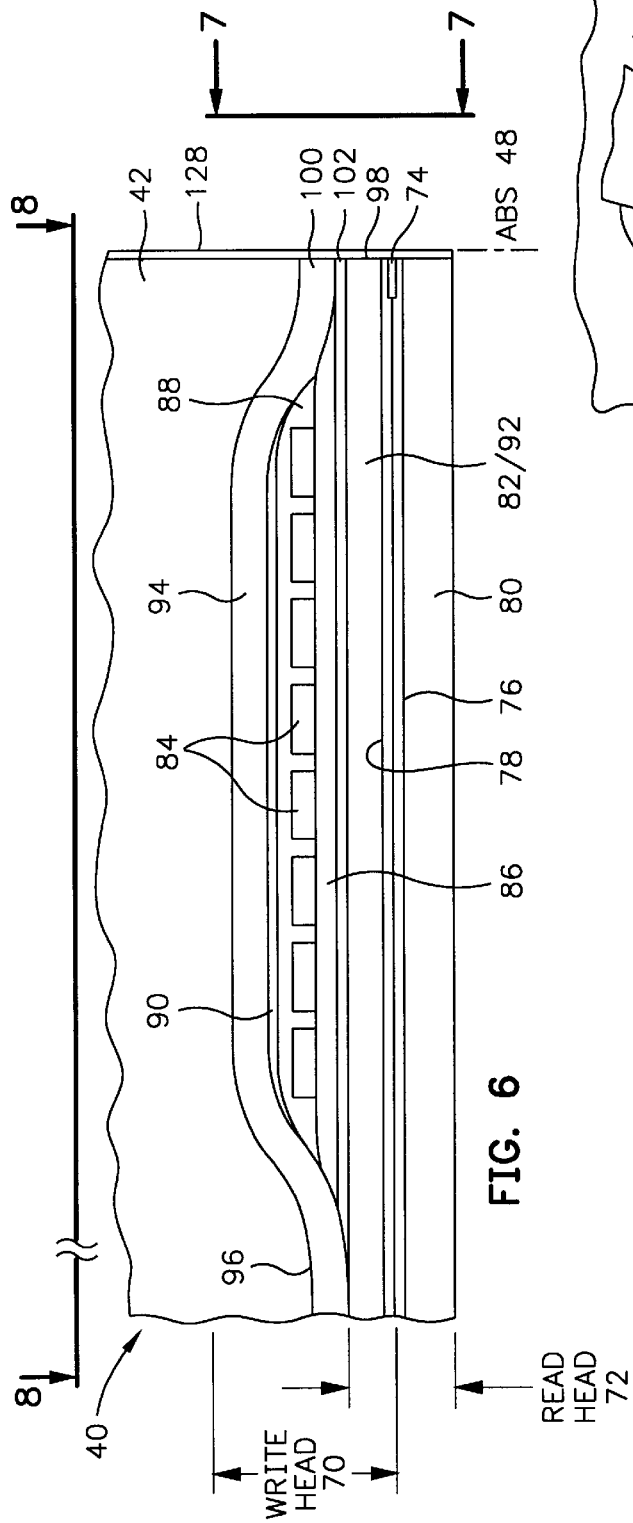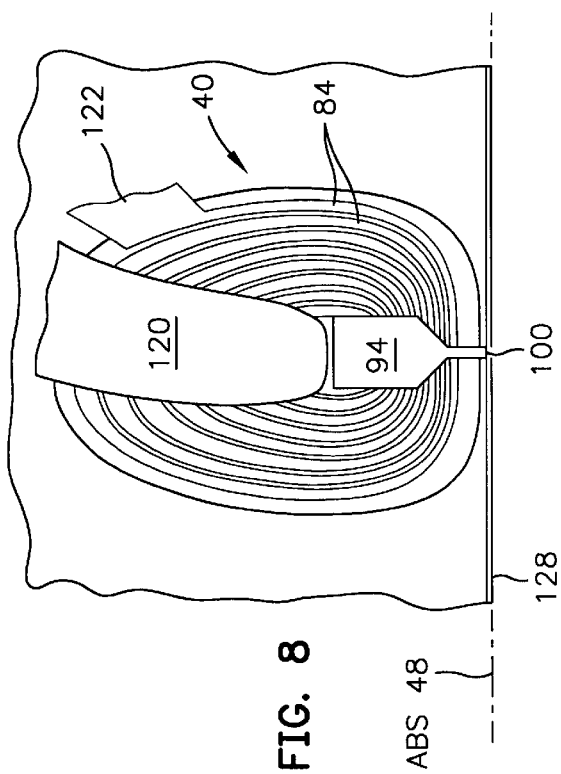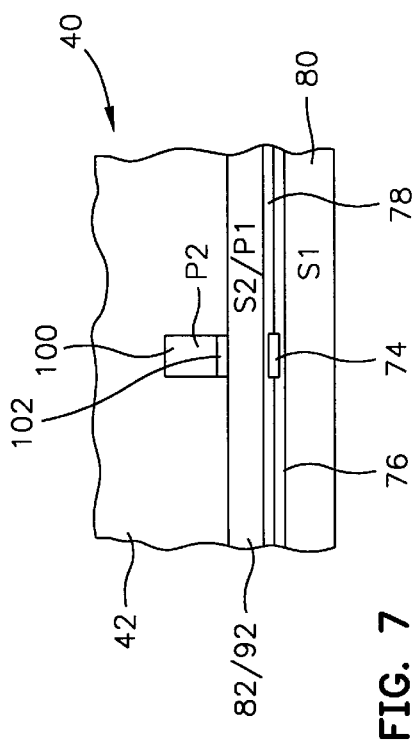
FIG. 6
FIG. 8
FIG. 7

READ HEAD WITH IMPROVED LEAD LAYERS AT AN AIR BEARING SURFACE

REFERENCE TO RELATED APPLICATION

This is a divisional application of application Ser. No. 09/176,387 filed Oct. 21, 1998.

BACKGROUND OF THE INVENTION

1. Field of the Invention

The present invention relates to a read head with improved lead layers at an air bearing surface and more particularly to high resistance lead layer portions of first and second lead layers that have improved dimensions and performance.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS to cause the slider to ride on an air bearing a slight distance from the surface of the rotating disk. The write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A magnetic gap is formed between the first and second pole piece layers by a write gap layer at an air bearing surface (ABS) of the write head. The pole piece layers are connected at a back gap. Current conducted to the coil layer induces a magnetic field across the gap between the pole pieces. This field fringes across the gap at the ABS for the purpose of writing information in tracks on moving media, such as in circular tracks on a rotating disk.

The read head includes first and second shield layers, first and second gap layers, a read sensor and first and second lead layers that are connected to the read sensor. The first and second gap layers are located between the first and second shield layers and the read sensor and the first and second lead layers are located between the first and second gap layers. The distance between the first and second shield layers determines the linear read density of the read head. Accordingly, the first and second gap layers are constructed as thin as possible without shorting the lead layers to the first and second shield layers. High linear density results in more bits being read by the read head per length of magnetic track passing by the read head on the rotating disk.

Each of the first and second leads has a high resistance lead layer and a low resistance lead layer. Each high resistance lead layer is a material that is resistant to corrosion since it has an edge exposed at the air bearing surface. The high resistance lead layer typically includes a film made of tantalum (Ta). Each low resistance lead layer is corrosive, but this is of no consequence since it is protected from the outside environment by being recessed in the head. The low resistance lead layer typically includes a film made of copper (Cu) or gold (Au).

The high resistance layer has multiple films. One of the films is the Ta film for conducting a sense current through the read sensor. Another one of the films is a hard bias film for longitudinally biasing the read sensor so that it is magnetically stabilized to prevent Barkhousen noise. In the past each high resistance lead layer extended from a respective side edge of the read sensor in a lateral direction (parallel to the ABS) before it extended back into the head to make contact with the low resistance lead layer. The longer the extension of the high resistance lead layer the thicker the high resistance lead layer has to be in order to maintain its resistance at an acceptable level. When the resistance gets too high the read head is damaged by heat. When the extension of the high resistance lead layer is made thicker in order to keep its resistance down planarization between the top surfaces of the read sensor layer and the high resistance lead layers is degraded.

The read sensor is bounded by a front edge at the ABS, first and second side edges that extend perpendicular to the ABS and a back edge that is spaced from the ABS and that defines a stripe height of the read head. Each high resistance lead layer has a forward edge that makes contact with a respective one of the first and second edges of the read sensor. This type of connection is referred to in the art as a contiguous junction. When the high resistance lead layers are thickened in order to reduce resistance their top surfaces are elevated with respect to the top surface of the read sensor. This causes a step adjacent each side edge of the read sensor. Unfortunately, these steps are replicated through the second gap layer and the second shield/first pole piece layer all the way to the write gap layer of the write head. Since the write head has to be made wider than the read head the write gap replicates these steps and takes on a curvature that seriously affects the write capability of the write head. The curved write gap causes the write head to write curved bits (magnetic signals) on the rotating track. When the straight across read head reads these curved bits it progressively loses magnetic intensity from a center of the bit toward outer edges of the track. Accordingly, there is a strong felt need to promote planarization of the read sensor and the high resistance leads so as to reduce write gap curvature.

We sought a method to construct the lead layers that would promote planarization between the read sensor and the high resistance lead layers at the ABS. One method investigated constructs the high resistance lead layers before the low resistance lead layers. In this method a read sensor material layer is deposited over an entire wafer. A first mask is formed that has openings at the high resistance lead layer sites which extend to the first and second side edges of the read sensor. Read sensor material is milled out at the high resistance lead layer sites and the high resistance lead layer material is deposited to form first and second high resistance lead layers at the high resistance lead layer sites that make contiguous junctions with the first and second side edges of the read sensor. This establishes the track width of the read. Track width density (number of tracks per inch of the magnetic disk) times the aforementioned linear density is the areal density of the read head. Increasing the areal density increases the bit density (number of bits per square inch of the magnetic medium) of the disk drive. The first mask is removed and a second mask is formed that covers the read sensor and the high resistance lead layers. All exposed read sensor material is then milled away to define the back edge and stripe height of the read sensor. The stripe height is important in establishing the magnetics of the read sensor.

The second mask is then removed and a third mask is formed that has openings at low resistance lead layer sites. Low resistance lead layer material is then deposited that forms first and second low resistance lead layers that overlap and engage the first and second high resistance lead layers. The third mask is then removed.

Unfortunately, the aforementioned method of making subjects the high resistance lead layers to subsequent processing since they are constructed before defining the se height of the read sensor and before constructing the low resistance lead layers. Since the second mask must be slightly inboard of the outer edges of the high resistance layer in order to ensure complete removal of unwanted read sensor material an outer edge portion of each high resistance lead layer is subjected to milling. Reduction of the high resistance layers due to subsequent processing requires that the thickness of the high resistance layers be increased as deposited in order to satisfy the resistance requirements. As stated hereinabove, thicker high resistance leads results in increased write gap curvature. Accordingly, there is a strong felt need to provide a method of making the read sensor leads that will not contribute to thicker high resistance lead layers.

SUMMARY OF THE INVENTION

Instead of extending the high resistance lead layers laterally before making a turn to connect to the low resistance lead layers the present invention extends the high resistance lead layers straight back into the head from each of the first and second side edges of the read sensor. This lessens the length of the each of the high resistance lead layers so that they do not have to be made thicker to satisfy the resistance requirements. Accordingly, a lateral width of each high resistance lead portion along the ABS and a thickness thereof are chosen so as to minimize the thickness while satisfying the resistance requirements.

Further, a method of making the first and second lead layers is provided that minimizes the thickness of the high resistance lead layers. Instead of constructing the high resistance lead layers first, the present method constructs the high resistance lead layers last. After depositing read sensor material over a wafer a first mask is formed that has openings at the low resistance lead layer sites. After milling the read sensor material from the low resistance lead layer sites low resistance lead layer material is deposited. This forms the first and second low resistance lead layers. A second mask is then formed that covers the read sensor site and the low resistance lead layers. The second mask has a large opening that exposes all unwanted read sensor material and has an edge that is located at the desired back edge (stripe height) of the read sensor. The read sensor material is milled away and the second mask is removed leaving the read sensor with a desired stripe height. Next the third mask is formed with openings at the first and second high resistance lead layer sites. After removing read sensor material at the first and second high resistance lead layer site high resistance lead layer material is deposited to form the first and second high resistance lead layers. The third mask is then removed. The high resistance lead layers are now complete and are more predictable since they have not been subjected to processing steps in the construction of the low resistance lead layers and the read sensor.

The present invention provides a special step after forming the second mask and milling away the unwanted read sensor material. The second mask covers the read sensor site as well as a portion of read sensor material layer adjacent first and second edge sites of the read sensor site. The second mask cannot define the first and second edges of the read sensor since this is the function of the third mask which implements a contiguous junction between the high resistance lead layers and the side edges of the read sensor. Accordingly, the second mask leaves some unwanted read sensor material adjacent each edge of the read sensor site. When the third mask is formed the openings therein expose this unwanted read sensor material as well as a portion of the first gap layer where unwanted read sensor material was removed during the second masking step. It should be noted that if each opening in the third mask did not expose some of the first gap layer there would be no assurance that all read sensor material was removed except at the read sensor site. Without protection the first gap layer is exposed to a developer for patterning the third mask and an ion milling process after patterning the third mask. The developer and the ion milling will seriously damage the insulating quality of the first gap layer. This problem has been overcome in the present invention by depositing an insulation refill material after milling has occurred in the second masking step. The insulation refill material will now be adjacent the unwanted read sensor material in each opening of the third mask. Accordingly, when milling is implemented the milling mills insulation refill material as well as the read sensor material. In the preferred embodiment the thickness of the refill insulation material is designed so that the refill insulation material and the read sensor material are consumed at the same time in each of the openings of the third mask at the high resistance lead layer sites. This then exposes the first gap layer with no damage. The high resistance. lead layer material can then be deposited in the openings in the third mask. The third mask is then removed.

An object of the present invention is to provide a read head with improved high resistance lead layers at the ABS.

Another object is to provide a minimal extension of the high resistance lead layers of a read head so that their thickness does not have to be increased to satisfy resistance requirements.

A further object is to provide a read head with first and second lead layers that are more planarized with respect to a read sensor.

Still another object is to provide a read head that does not adversely impact the straightness of a write gap layer of a write head.

Still another object is to provide a method of making first and second lead layers of a read head that promotes planarization of the lead layers and a read sensor.

Still other objects and advantages of the invention will become apparent upon reading the following description taken together with the accompanying drawings.

BRIEF DESCRIPTION OF THE DRAWINGS

FIG. 1 is a plan view of an exemplary magnetic disk drive;

FIG. 2 is a view taken along plane 2—2 of FIG. 1 showing a slider with a magnetic head (hidden lines) of the disk drive;

FIG. 3 is an elevation view of the magnetic disk drive wherein multiple disk and magnetic heads are employed;

FIG. 6 is a partial view of the slider and a magnetic head as seen in plane 6—6 of FIG. 2;

FIG. 7 is a partial ABS view of the slider taken along plane 7—7 of FIG. 6 to show the read and write elements of the magnetic head;

FIG. 8 is view taken along plane 8—8 of FIG. 6 with all material above the coil layer and lead layers removed;

DESCRIPTION OF THE PREFERRED EMBODIMENTS

Magnetic Disk Drive

Figure 4:
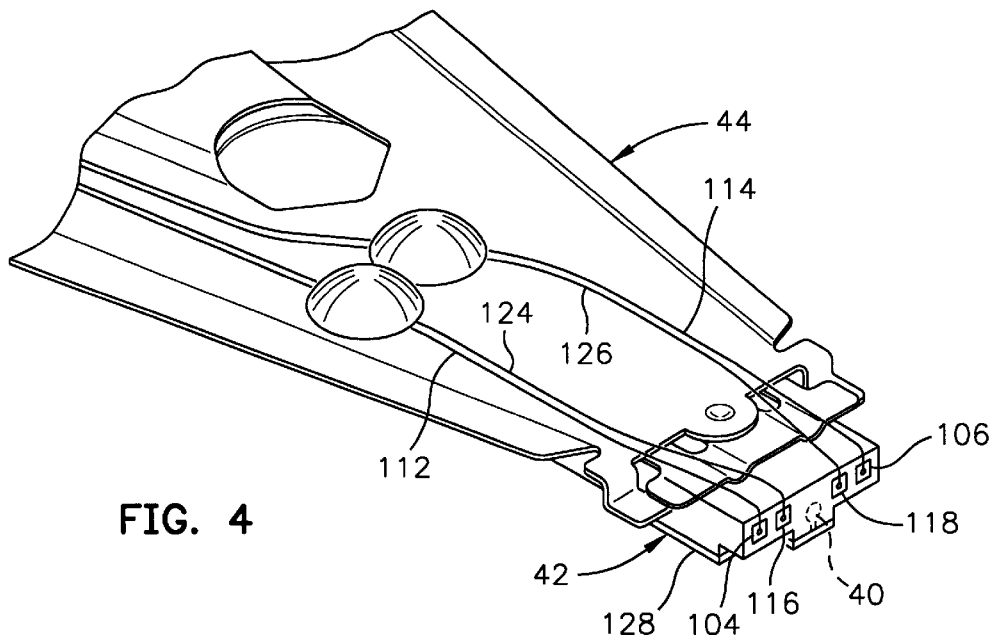
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information in the form of magnetic field incursions or the absence thereof to multiple circular tracks on the surface of the disk 34, as well as for reading information in the same form therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
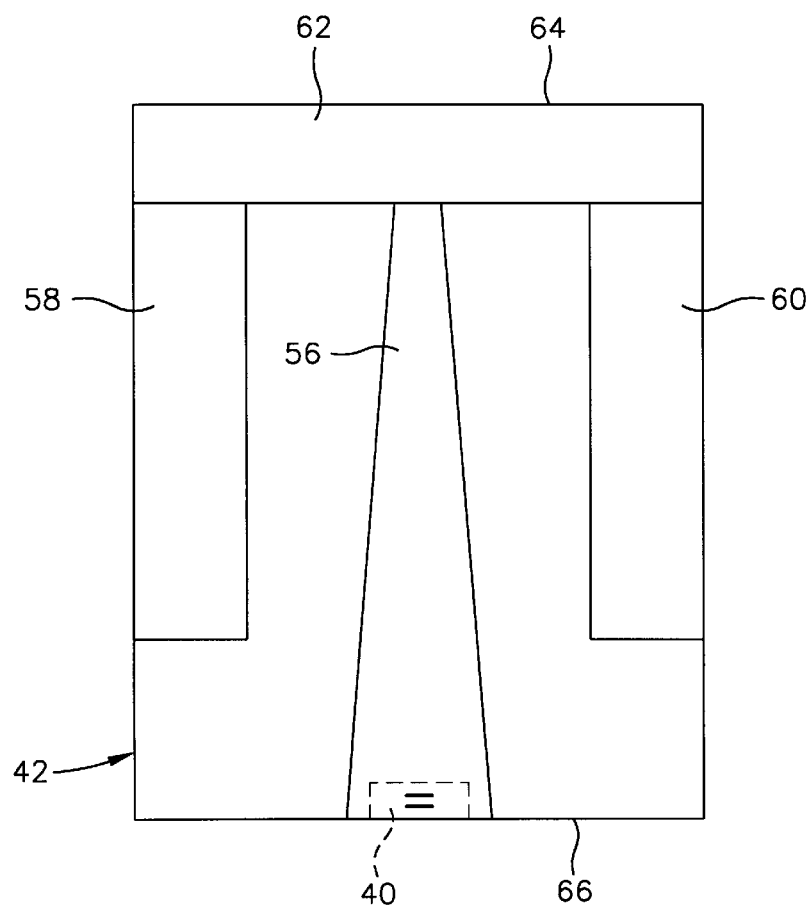
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Magnetic Merged Head

FIG. 6 is a side cross-sectional elevation view of the merged MR or spin valve head 40 which has a write head portion 70 and a read head portion 72, the read head portion employing a magnetoresistive (MR) or spin valve sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

The write head portion of the merged head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98. and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged head 50 employs a single layer 82/92 to serve a double function as a second shield layer for the read head and as a first pole piece for the write head. A piggyback head employs two separate layers for these functions.

Prior Art Magnetic Head

Figure 9:
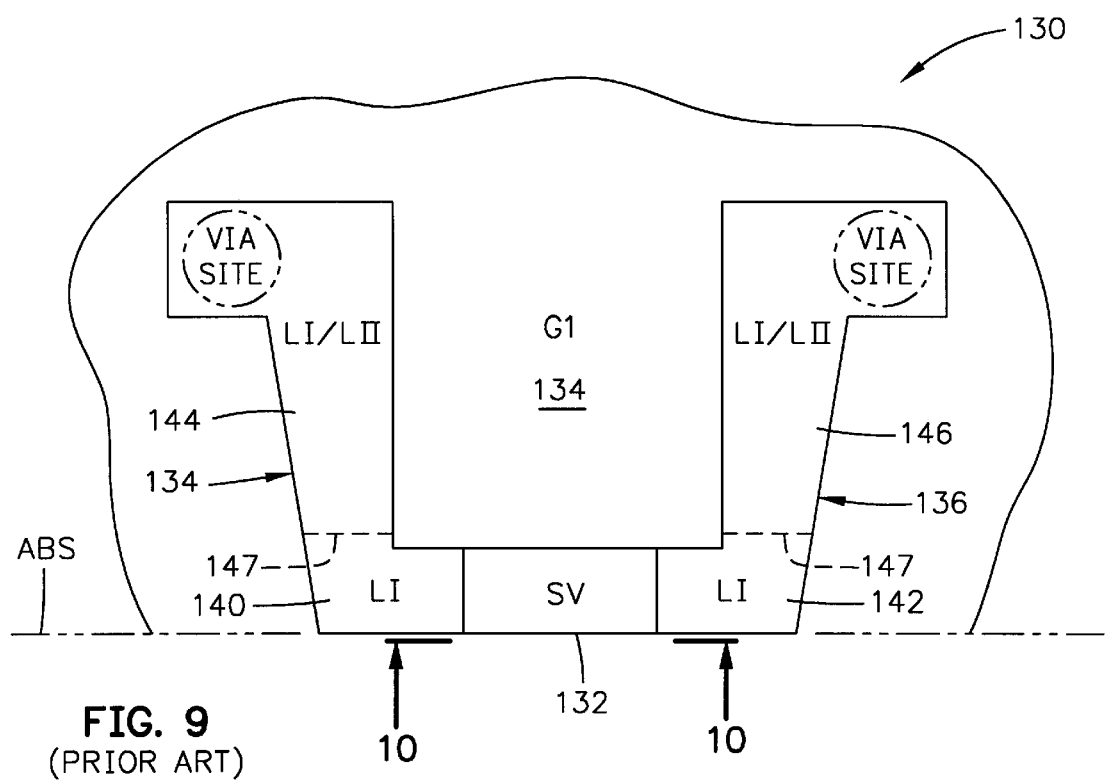
FIG. 9 is a plan view of a prior art read sensor and first and second leads connected thereto.

FIG. 9 shows a prior art partially completed read head which includes a spin valve (SV) sensor 132 connected at its side edges to first and second lead layers 134 and 136. The spin valve sensor 132 and the lead layers 134 and 136 are on a first gap layer (G1) 138. The lead layers 134 and 136 include high resistance lead layer portions (LI) 140 and 142, respectively, and low resistance lead layer portions (LII) 144 and 146 respectively. The low resistance lead layers 144 and 146 extend from via sites to front edges 147. Each of the high resistance lead layers 140 and 142 extends transverse the head (parallel to the ABS), thence rearwardly to connect with the low resistance lead layer portions 144 and 146. As shown, the high resistance lead layer portions 140 and 142 may completely overlap the complete low resistance lead layer portions 144 and 146 all the way to the via sites as desired. Because of the transverse extension of the high resistance lead layer portions 140 and 142 before they bend 90° to connect to low resistance lead layers 144 and 146 they will be required to have increased thickness in order to lower their resistance to an acceptable level. This extra thickness results in a higher profile and write gap curvature which is explained hereinbelow.

Figure 10:
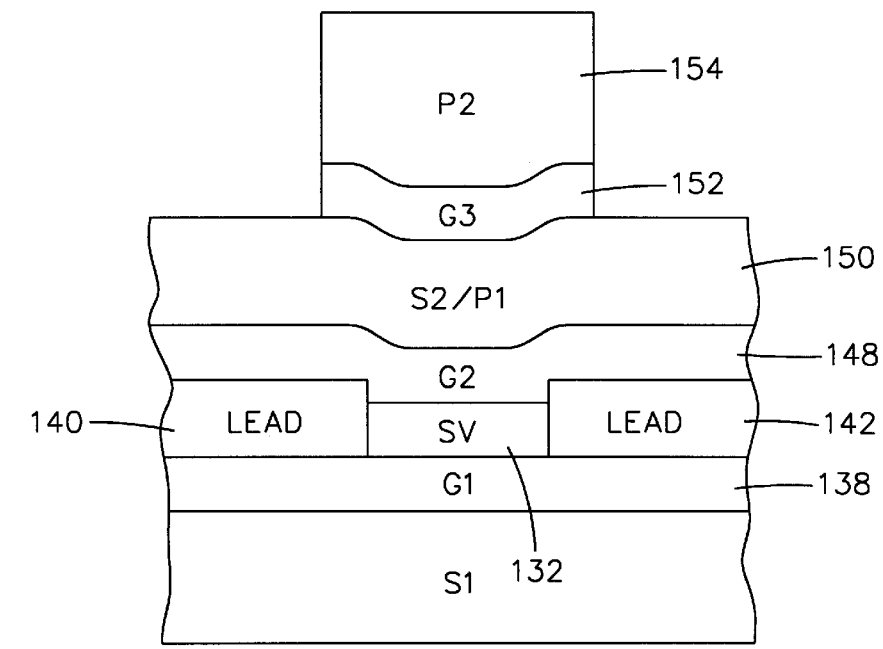
FIG. 10 is a view taken along plane 10—10 of FIG. 9.

FIG. 10 is a view taken along plane 10—10 of FIG. 9 with the second read gap layer (G2) 148, the second shield and first pole piece layer (S2/P1) 150, the write gap layer (G3) 152 and the second pole piece layer (P2) 154 added thereto. It can be seen that the higher profile of the first and second high resistance lead layer portions 140 and 142 relative to the spin valve sensor 132 causes steps that are replicated through the second read gap layer 148 and the second shield first pole piece layer 150 to the write gap layer 152. This causes the write gap layer 152 to have a curvature which will, in tun, cause the write head to write curved magnetic signatures on the circular track of the rotating disk. When the straight-across spin valve sensor 132 is mandated to read this magnetic information the signal will be strong at the center of the spin valve sensor 132 and will decay toward its edges because of the curvature of the magnetic signature that it is reading.

Present Magnetic Read

Figure 11:
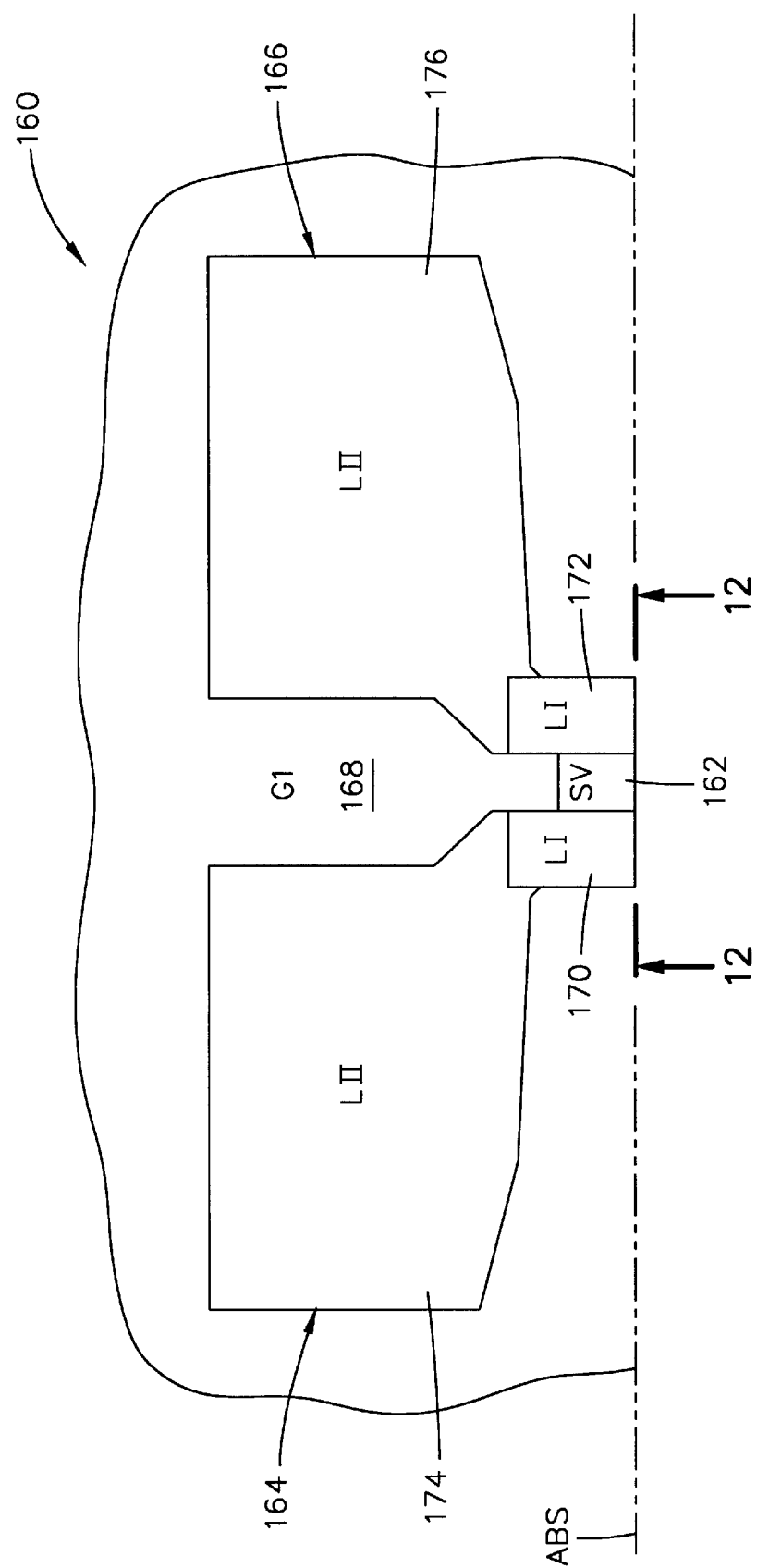
FIG. 11 is a plan view of the present read sensor and first and second leads of the present invention.

In FIG. 11 the present partially completed read head 160 is illustrated wherein a spin valve sensor 162 is connected to first and second lead layers 164 and 166. The spin valve sensor 162 and the first and second lead layers 164 and 166 are on a first gap layer (G1) 168. The first and second lead layers 164 and 166 include first and second high resistance lead layer portions (LI) 170 and 172, respectively, and first and second low resistance lead layer portions (LII) 174 and 176, respectively. The first and second high resistance lead layer portions 170 and 172 extend straight back from the ABS instead of making a 90° bend, as shown in FIG. 9 in the prior art embodiment. With this arrangement the length of the high resistance lead layer portions 170 and 172 are minimized so that their thickness can be reduced. The first and second high resistance lead layer portions 170 and 172 overlap the first and second low resistance lead layer portions 174 and 176 so as to make electrical connection therewith. If desired the first and second high resistance lead layer portions 170 and 172 may completely overlap the low resistance lead layer portions 174 and 176 instead of partially overlapping them as shown in FIG. 11.

Figure 12:
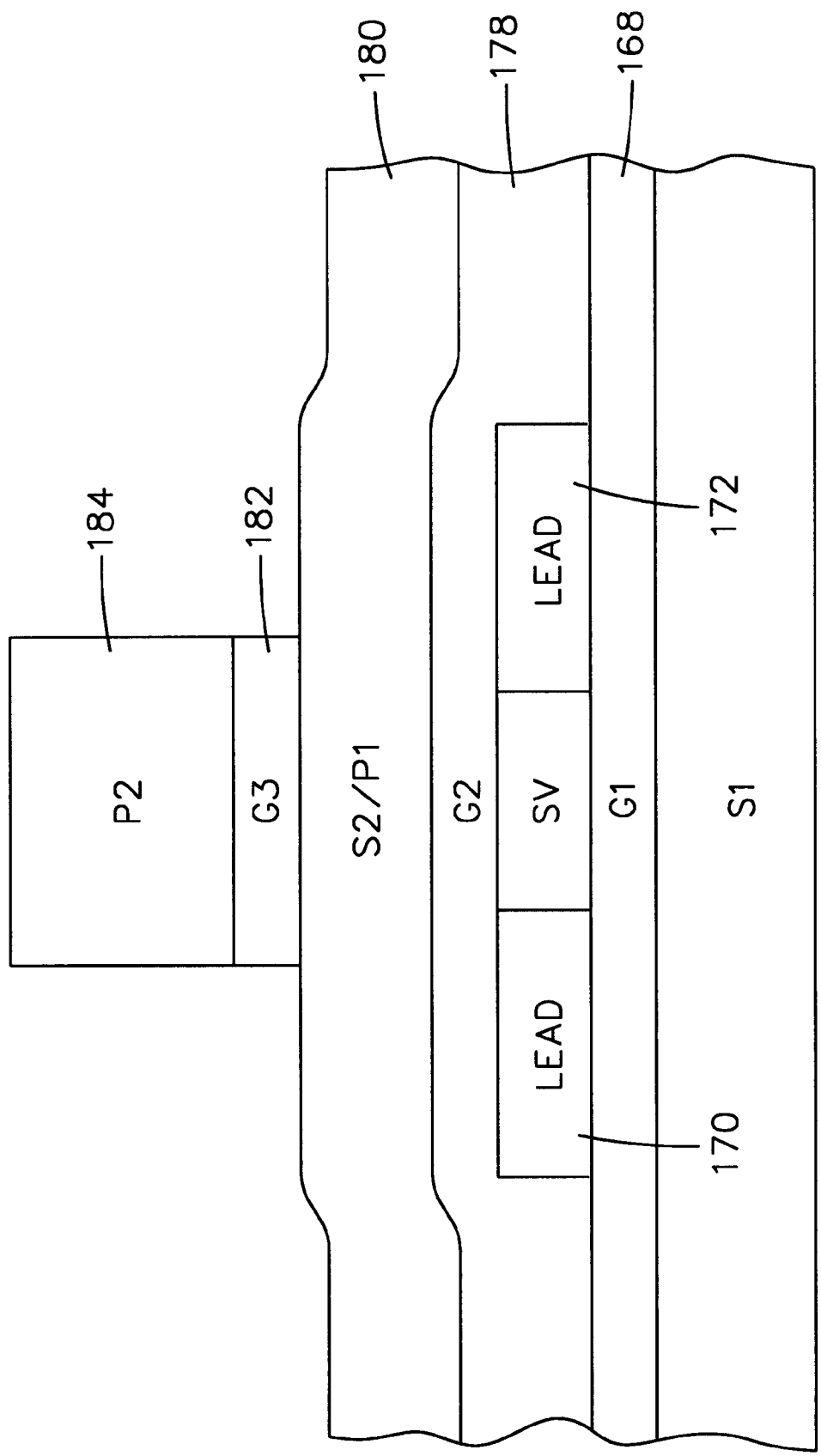
FIG. 12 is a view taken along plane 12—12 of FIG. 11.

FIG. 12 is an ABS illustration of FIG. 11 with a second read gap layer (G2) 178, a second shield first pole piece (S2/P1) 180, a write gap layer (G3) 182 and a second pole tip (P2) 184 added thereon. As stated hereinabove, since the first and second lead layer portions 170 and 172 have less length than the first and second high resistance lead layer portions 140 and 142 in the prior art embodiment, shown in FIG. 9, their thickness can be less as illustrated in FIG. 12. While no step is shown between the first and second high resistance lead layer portions 170 and 172 relative to the spin valve sensor 162 for illustration purposes we claim that any step therebetween will be less than the step shown in FIG. 10 for the prior art embodiment due to our invention as shown in FIG. 11.

It should be noted from FIGS. 11 and 12 that when the second gap layer (G2) 178 is formed at the locations where the high resistance lead layers (LI) 170 and 172 overlap the low resistance lead layers (LII) 174 and 176 that the first and second low resistance layers (LII) 174 and 176 are sandwiched between the first gap layer 168 and a portion of the first and second high resistance lead layers (LI) 170 and 172. In a unique method of manufacturing, which will be described in detail hereinafter, the first and second high resistance lead layers (L1) 170 and 172 are constructed after the formation of the first and second low resistance lead layers (LII) 174 and 176 and after definition of the spin valve sensor 162 so that the first and second high resistance lead layers (LI) 170 and 172 are not subjected to process variations which decrease and make their final size unpredictable. When there are process variations the first and second high resistance lead layers (LI) 170 and 172 must be made thicker in order to compensate for these variations. In order to ensure that proper resistance requirements are met for the sense circuit the designers err on the side of making the first and second high resistance lead layers (L1) 170 and 172 with an extra thickness so that after the process variations the first and second high resistance lead layers (L1) 170 and 172 are not below the thickness that is required to satisfy the resistance requirements. This extra thickness to ensure the resistance requirements results in steps on each side of the spin valve sensor 162 which are replicated to the write gap layer 182 in the form of a write gap curvature. Accordingly, by constructing the first and second high resistance lead layers (LII) 174 and 176 and defining the spin valve sensor 162 before forming the first and second high resistance lead layers (L1) 170 and 172, write gap curvature due to an extra thickness of the first and second high resistance lead layers (LI) 170 and 172 to account for process variations has been obviated.

FIGS. 13–28 illustrate a previous method of making a read head and FIGS. 29–43 illustrate the present process for making the present read head. In both methods, ion beam deposition or sputter deposition is employed for depositing the metal and insulation layers. The masks are preferably bilayer photoresist layers wherein a bottom photoresist layer is recessed from a top photoresist layer so that a dissolvent can dissolve the bottom layer, thereby permitting the mask to be lifted from the wafer carrying with it the sputtered material deposited thereon. Stippled layers are insulation layers and heavy lines show the outlines of the masks. LI represents a high resistance lead layer and LII represents a low resistance lead layer. S1 and S2 designate first and second shield layers and G1 and G2 designate first and second read gap layers.

Exemplary Method of Construction of Prior Art Magnetic Head

Figure 13:
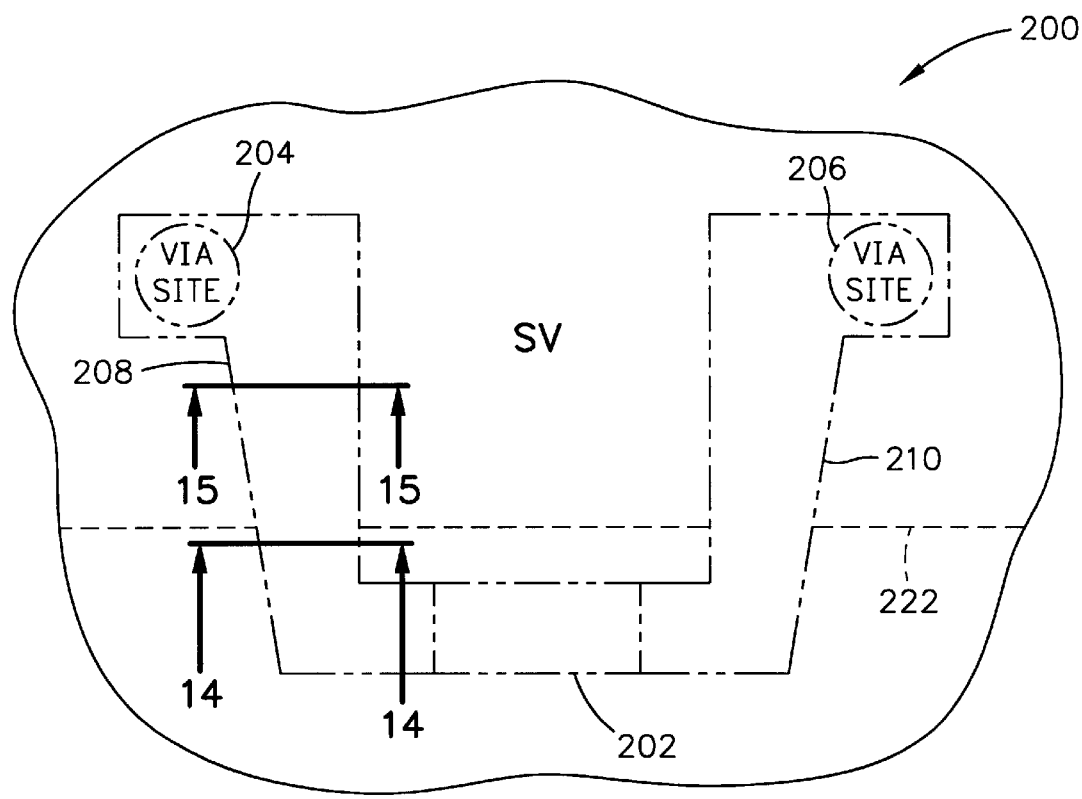
FIG. 13 is a plan view of a portion of a wafer wherein a layer of spin valve material has been deposited and wherein read sensor and first and second lead layer sites are shown in phantom.
Figures 14, 15:
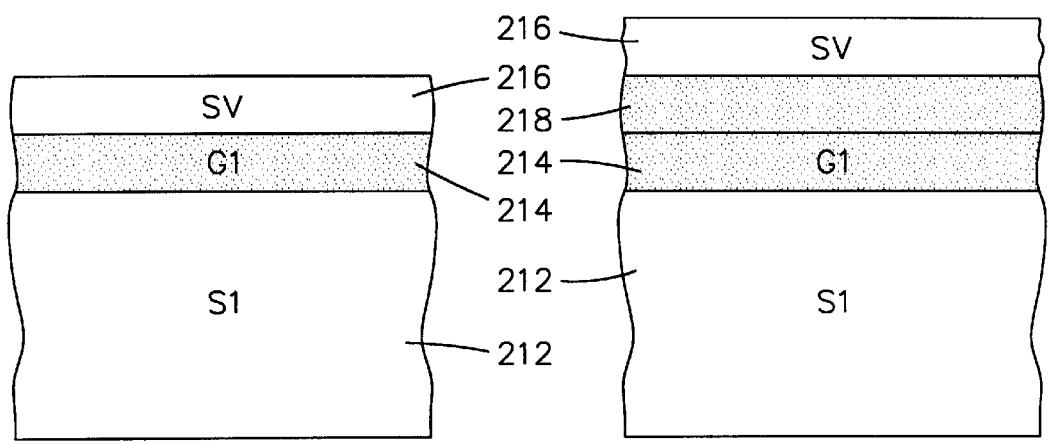
FIG. 14 is a view taken along plane 14—14 of FIG. 13.
FIG. 15 is a view taken along plane 15—15 of FIG. 13.

FIG. 13 is a plan view of a portion 200 of a wafer where a spin valve (SV) read head is to be constructed along with other read heads (not shown) arranged in rows and columns (not shown) on the wafer. The wafer portion 200 shows a read sensor site 202, first and second via sites 204 and 206, and first and second lead layer sites 208 and 210 which electrically connect side edges of the sensor to the via sites. Each via site 204 and 206 is a vertically disposed (out of paper) electrical conductor connecting a lead to a respective terminal (see 104 and 106 in FIG. 2). As shown in FIG. 14, a first shield layer 212, a first gap layer 214 and a SV material layer 216 have been formed while, as shown in FIG. 15, the first shield layer 212, the first insulative gap layer 214, a first insulation layer 218 and the SV material layer 216 have been formed. In this process, a first mask (not shown) was employed for constructing the first insulation layer 218 on top of the first gap layer 214 behind the sensor site along line 222. The purpose of the first insulation layer 218 is to provide extra insulation for the first and second lead layers that are to be constructed at the lead layer sites 208 and 210. The extra insulation prevents shorting of the leads through pinholes in the first gap layer 214 to the first shield layer 212. It should be noted that a front portion of each lead layer site below line 222 is left unprotected by the first insulation layer 218.

Figure 16:
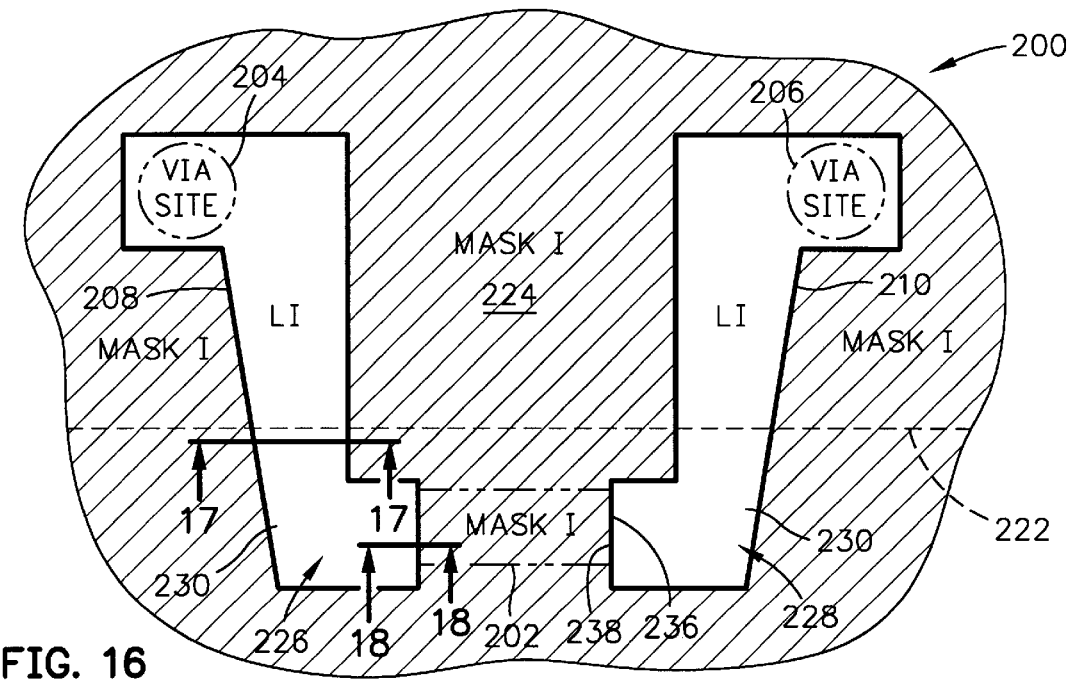
FIG. 16 is the same as FIG. 13 except a first mask has been formed with openings where SV material has been milled and high resistance lead layer material has been deposited.
Figure 17:
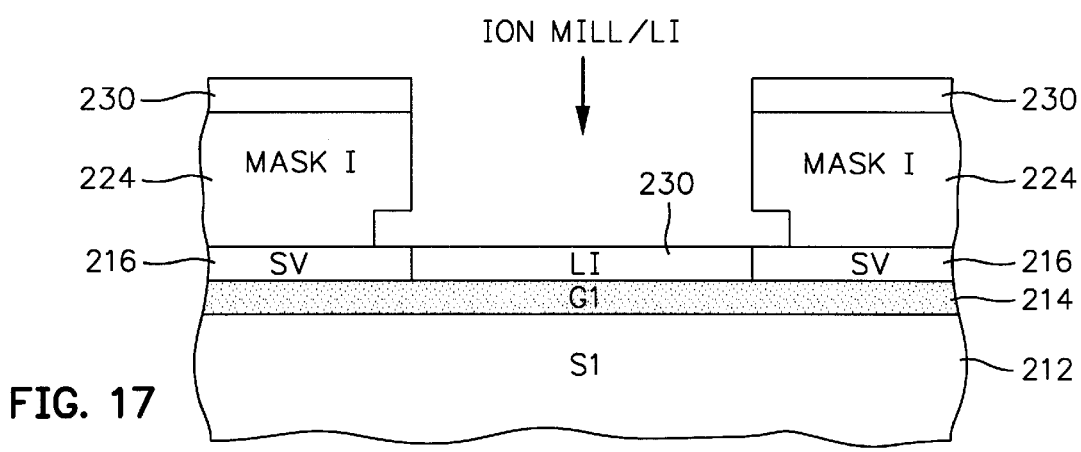
FIG. 17 is a view taken along plane 17—17 of FIG. 16.
Figure 18:
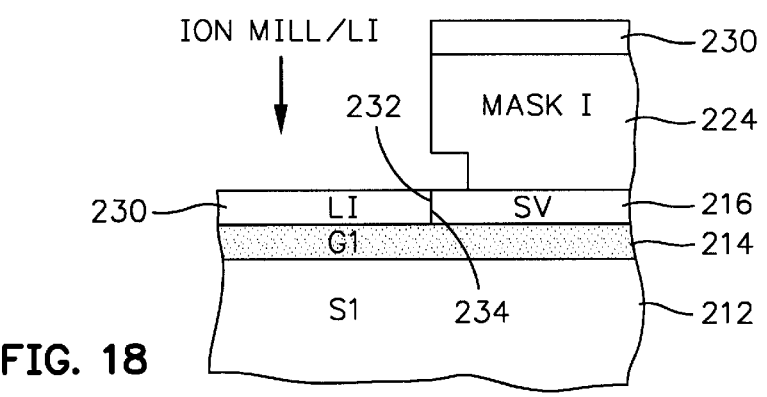
FIG. 18 is a view taken along plane 18—18 of FIG. 16.
Figure 19:
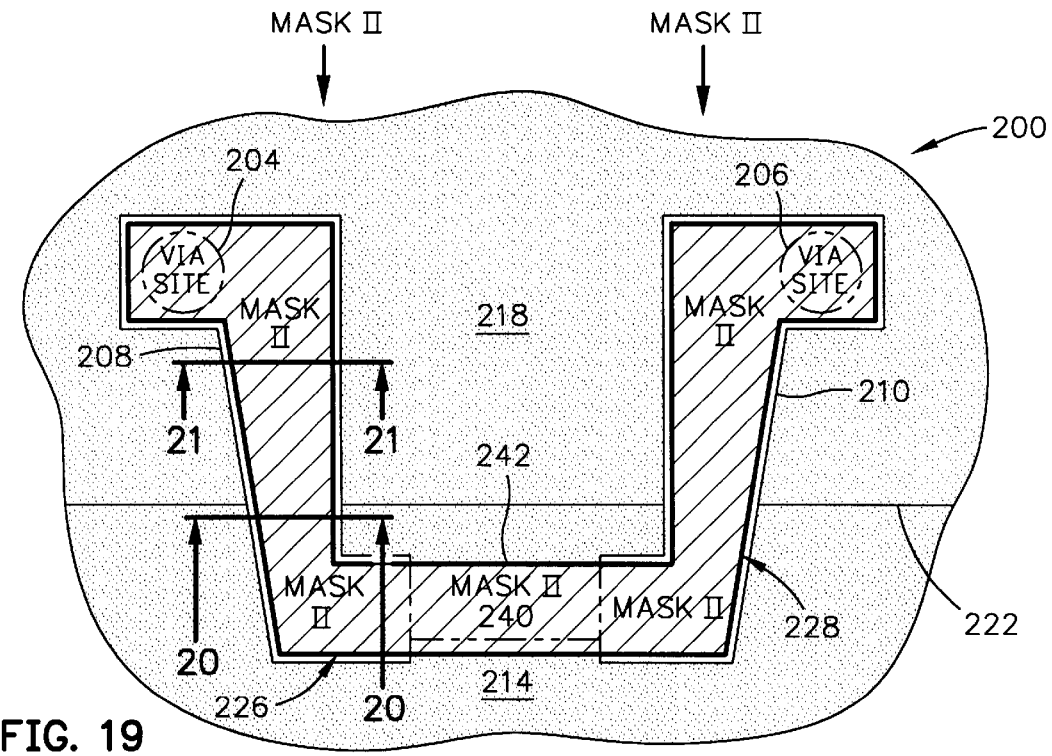
FIG. 19 is the same as FIG. 16 except the first mask has been removed and a second mask has been formed wherein the read sensor has been defined by milling
Figure 20:
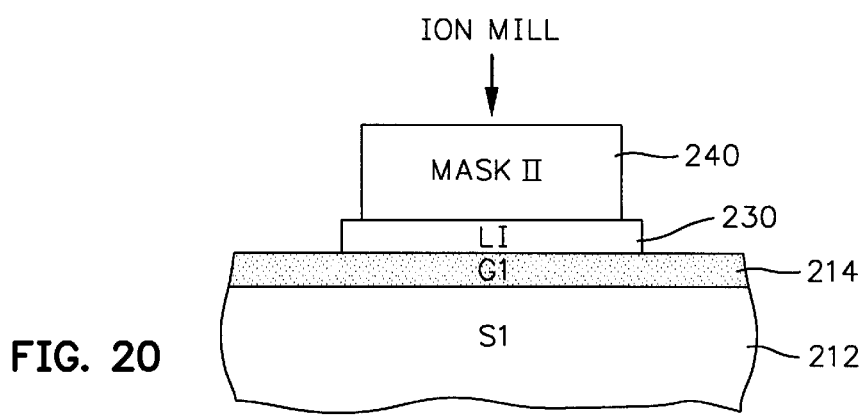
FIG. 20 is a view taken along plane 20—20 of FIG. 19.
Figure 21:
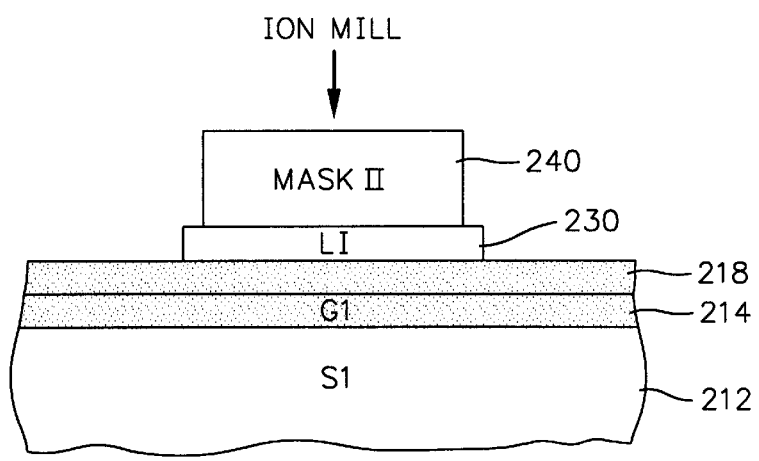
FIG. 21 is a view taken along plane 21—21 of FIG. 19.

In FIG. 16 a liftoff mask 224 is employed for covering the entire wafer portion except portions 226 and 228 within the first and second lead layer sites. As shown in FIGS. 17 and 18, the SV material layer 216 within the front lead layer sites 226 and 228 is milled away and hard bias and first lead layer films (shown as one film 230) are deposited on the first gap layer 214. It should be noted that the film 230 is formed as a full film deposition in which a portion of the film 230 is deposited on top of the mask 224. As stated hereinabove, the mask 224 is a bilayer photoresist mask (shown as one layer) with the bottom layer recessed from the top layer so that a dissolvent can dissolve the bottom. This allows the mask 224 to be removed from the wafer along with the film 230, which is done in a subsequent step. It should be noted in FIGS. 16 and 18 that the SV sensor material 216 at the sensor site 202 has been formed with a side edge 232 which directly abuts an end 234 of the film 230 at the first lead layer site to form a contiguous junction therebetween. An opposite side edge 236 of the sensor also forms a contiguous junction with an end 238 of the film 230 at the second lead layer site 228. In FIGS. 19, 20 and 21, the mask 224 in FIG. 16 has been removed and a second mask 240 has been formed covering only the sensor site 202 and slightly smaller portions of 226 and 228 of the first and second lead layer sites. As shown in FIGS. 20 and 21, the remainder of the SV material 216 is ion mined away so as to define the height of the MR sensor, which is shown at 242. Unfortunately, a portion (not shown) of the perimeter of the first lead layer film 230, is removed thereby elevating its resistance.

Figure 22:
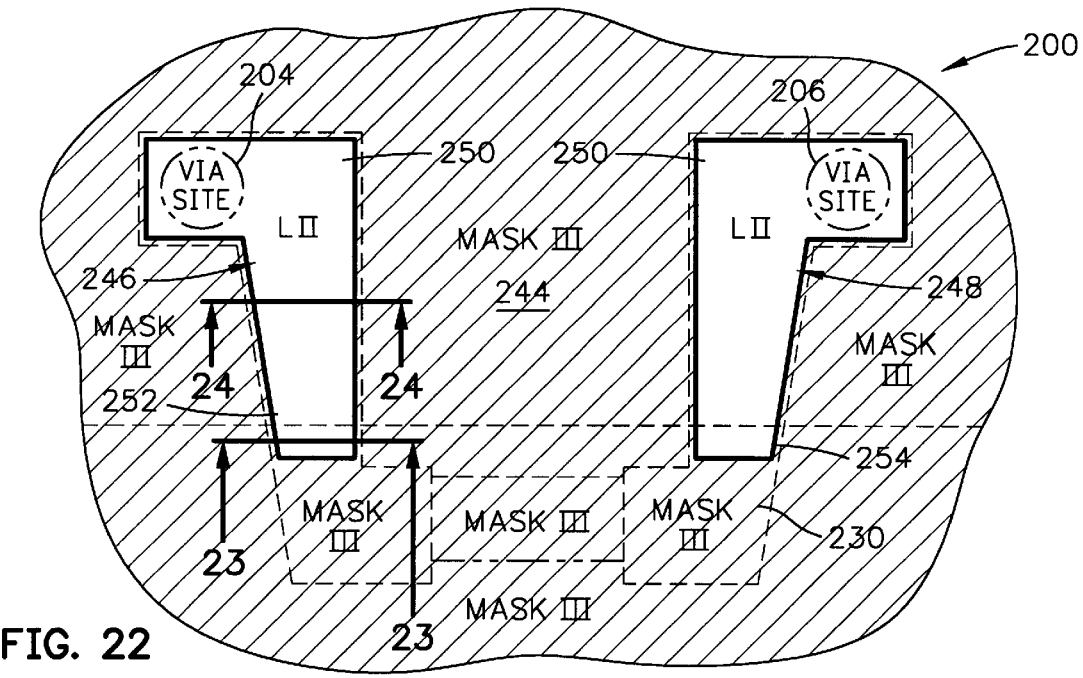
FIG. 22 is the same as FIG. 19 except the second mask has been removed and a third mask has been formed after which low resistance lead layer material has been deposited.
Figure 23:
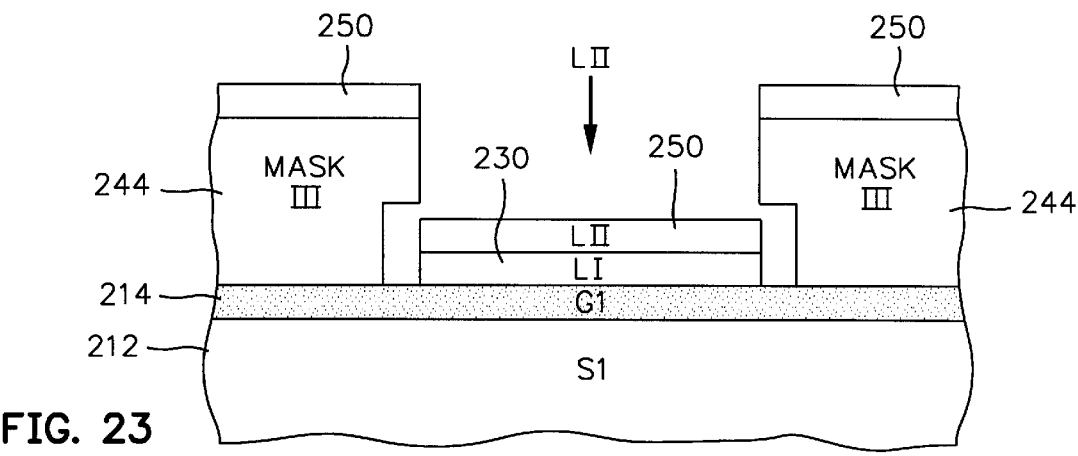
FIG. 23 is a view taken along plane 23—23 of FIG. 22.
Figure 24:
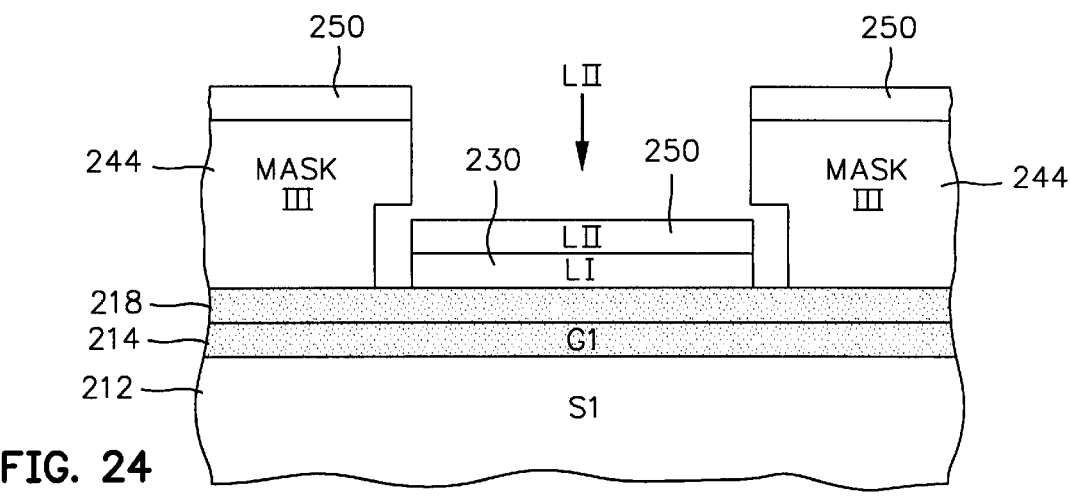
FIG. 24 is a view taken along plane 24—24 of FIG. 22.
Figure 25:
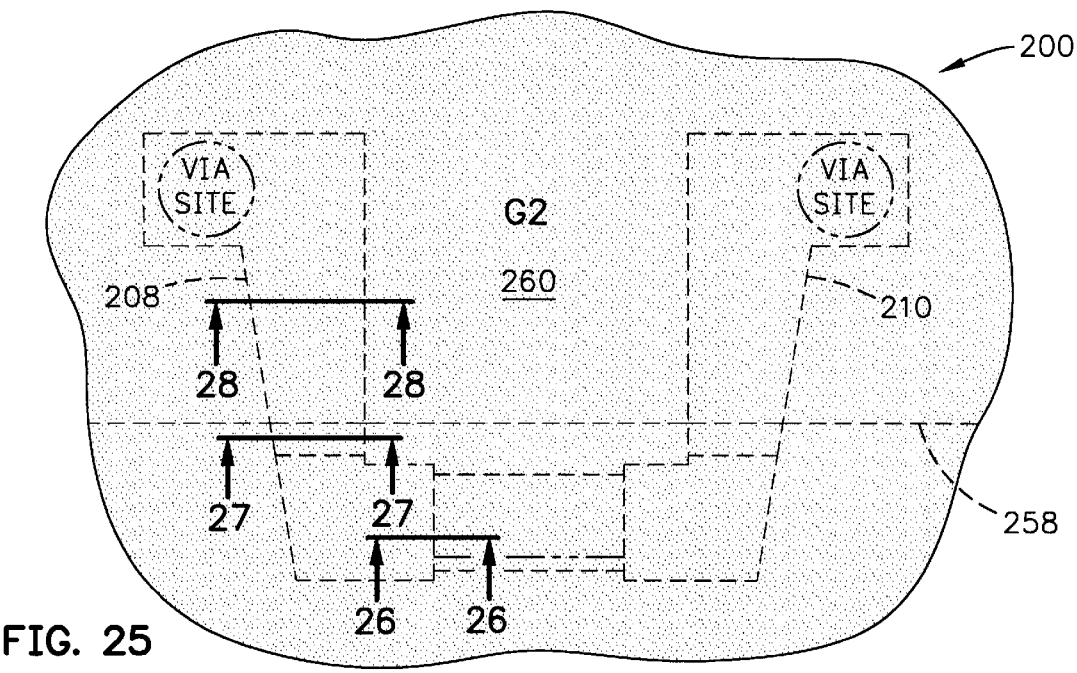
FIG. 25 is the same as FIG. 22 except a second gap layer has been deposited.
Figure 26:
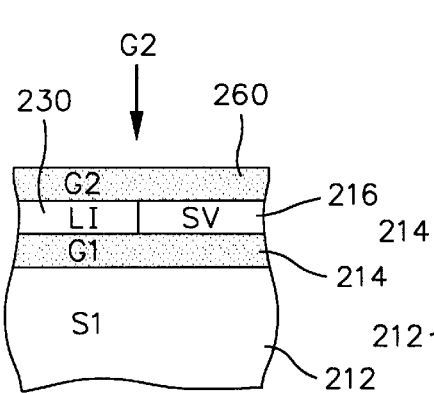
FIG. 26 is a view taken along plane 26—26 of FIG. 25.
Figure 27:
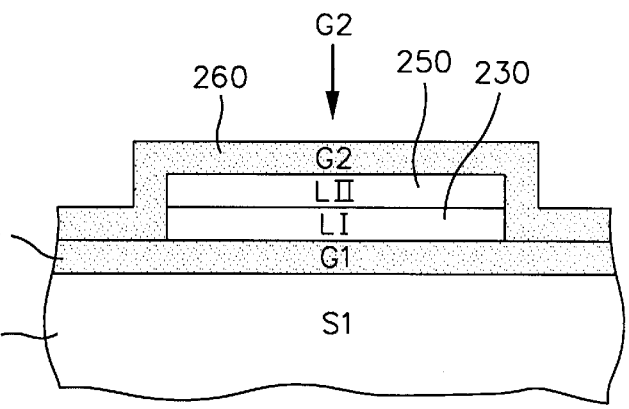
FIG. 27 is a view taken along plane 27—27 of FIG. 25.
Figure 28:
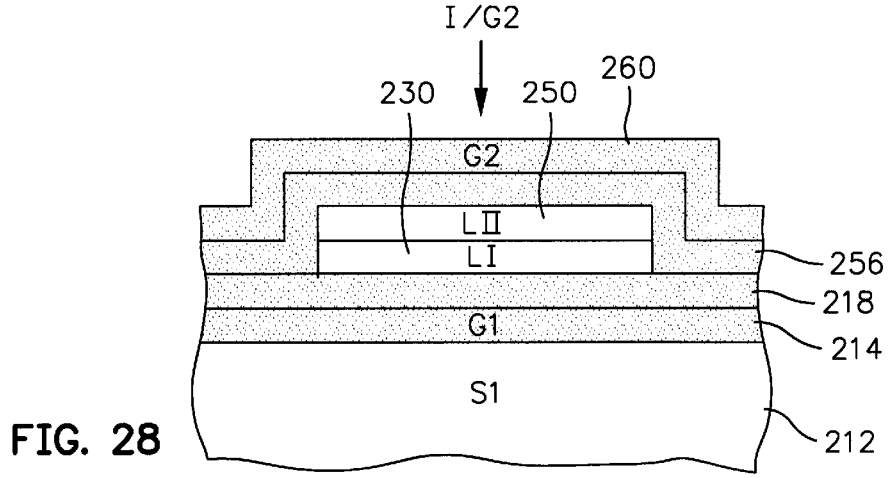
FIG. 28 is a view taken along plane 28—28 of FIG. 25.

In FIGS. 22, 23 and 24, the second mask 240 of FIG. 19 has been removed and a third mask 244 has been formed over the entire wafer portion 200, except rear portions 246 and 248 of the first and second lead layer sites. A second lead layer film 250 is deposited in the openings 246 and 248 so as to overlap and make connection with the underlying first lead layer films so that the lead layer films extend to the via sites 204 and 206. In FIG. 28, a second insulation layer 256 is formed in the rear portion of the head outside of the MR sensor frame, a front boundary thereof being shown at 258 in FIG. 25. A fourth mask (not shown) is employed for forming the second insulation layer 256. After removing the fourth mask a full film of a second insulative gap layer (G2) 260 is formed, as shown in FIGS. 25–28. It should be noted that in reality the lead layers 230 and 250 throughout the figures having sloping side edges and the lead layer 230 will have a higher profile than the spin valve sensor 216 in FIG. 18.

Present Method of Construction

Figure 29:
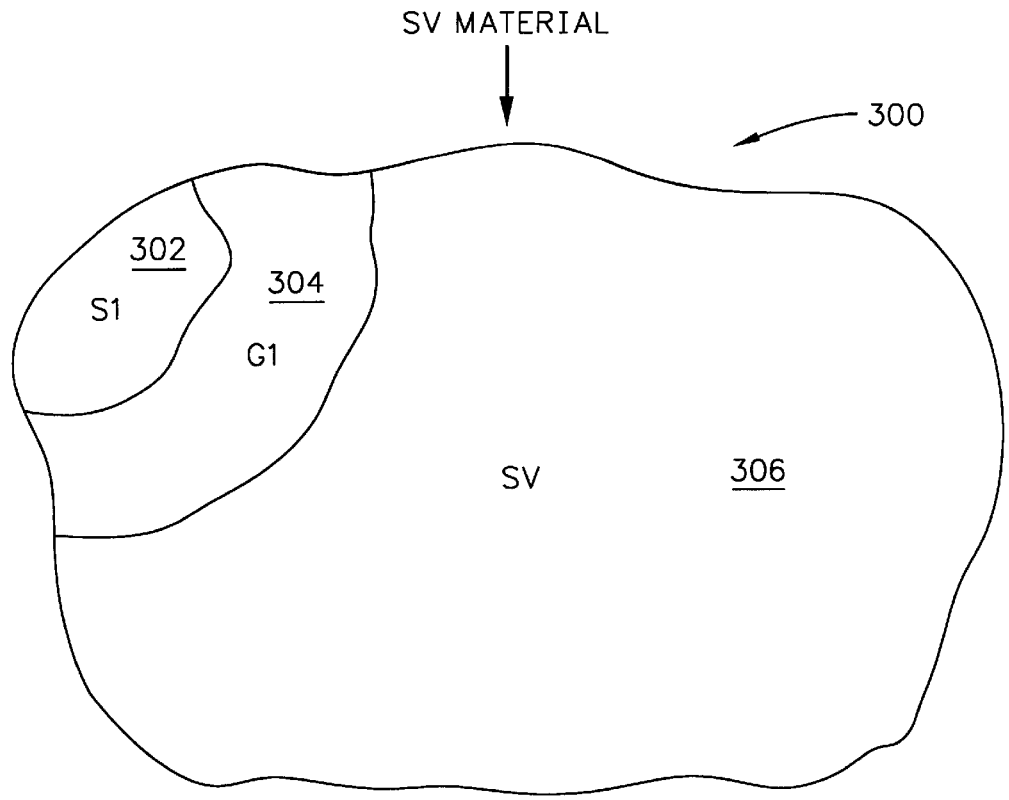
FIG. 29 is a plan view of a portion of a wafer wherein spin valve material has been deposited as a first step in implementing the method of the present invention.

FIG. 29 shows a portion of a wafer 300 where a read head is to be constructed. After depositing a first shield layer (S1) 302 and a first gap layer in (G1) 304 a read sensor material layer 306 is deposited on the wafer. In a preferred embodiment the read sensor material is a spin valve (SV) material.

Figure 30:
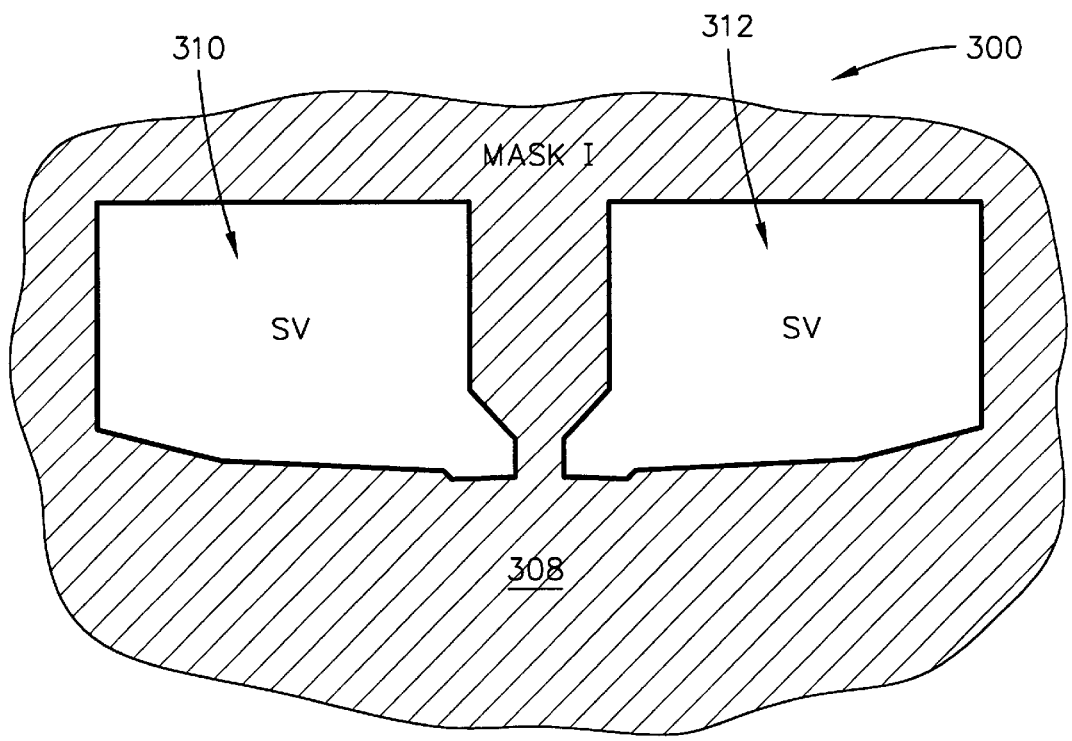
FIG. 30 is the same as FIG. 29 except a first mask has been formed with first and second openings at low resistance lead layer sites.
Figure 31:
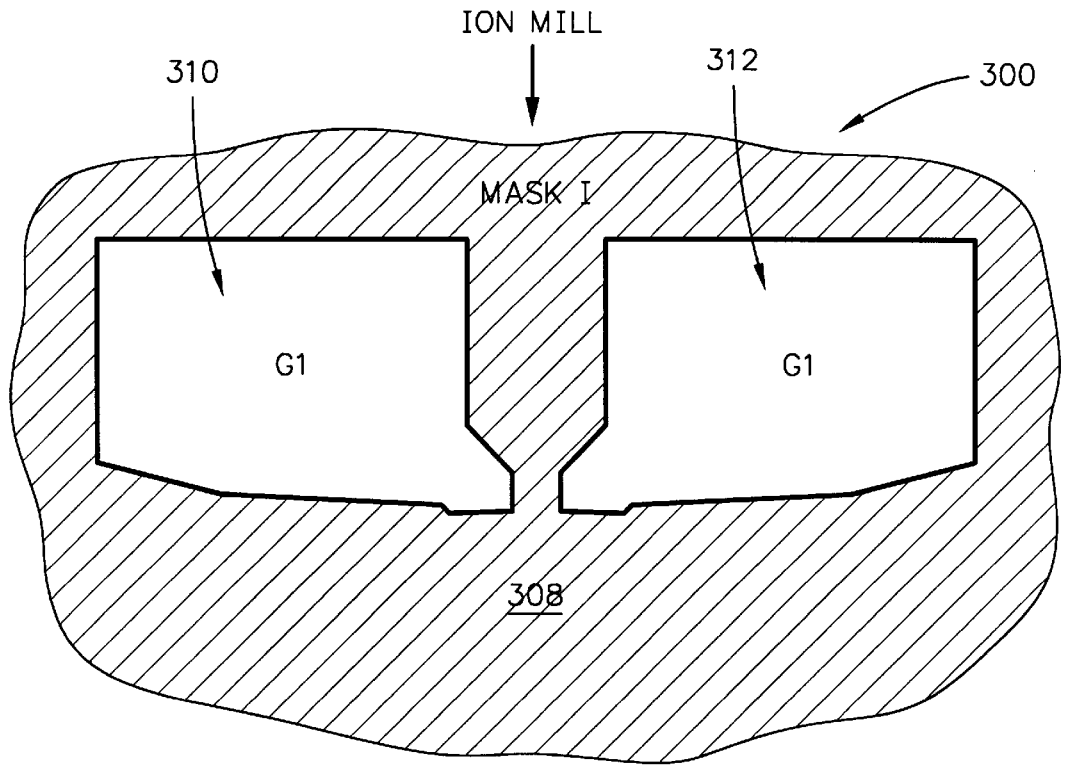
FIG. 31 is the same as FIG. 30 except ion milling has been implemented to remove the spin valve material within the first and second openings.
Figure 32:
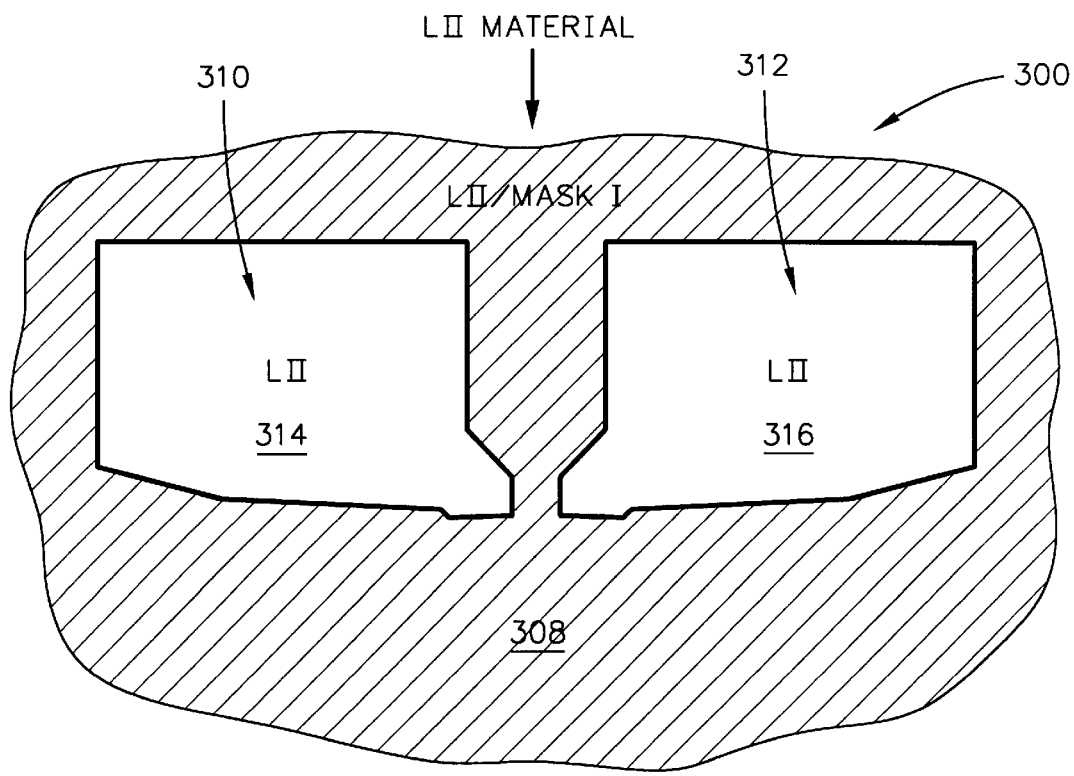
FIG. 32 is the same as FIG. 31 except low resistance lead layer material has been deposited in the first and second openings.
Figure 33:
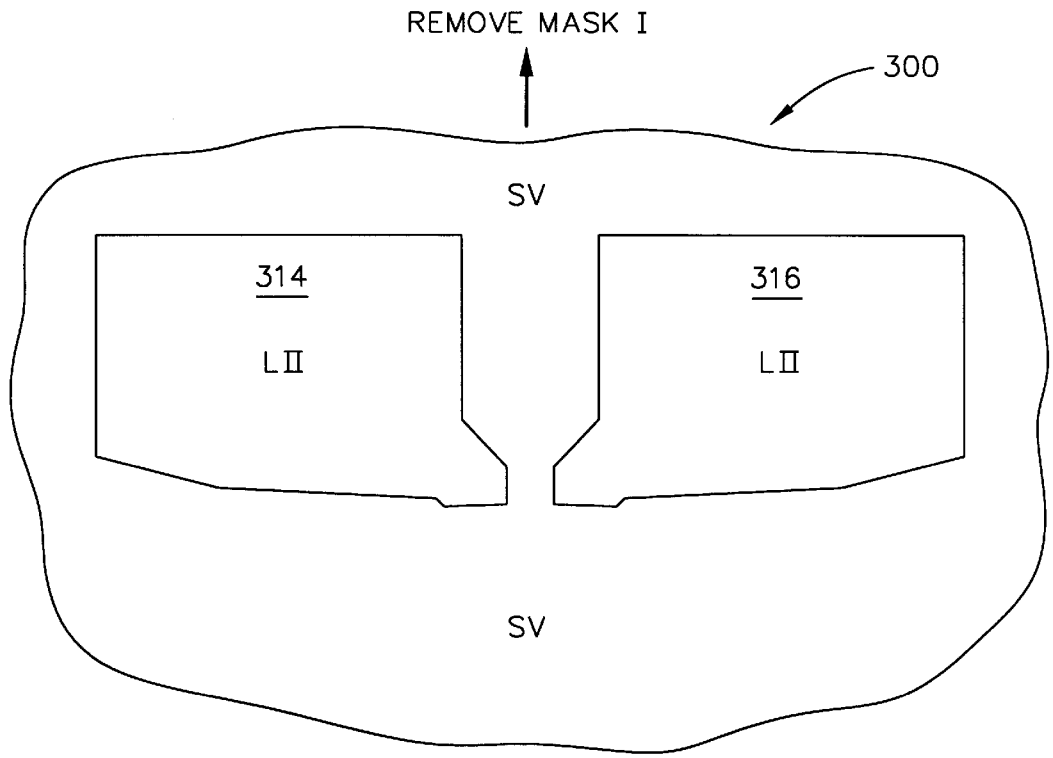
FIG. 33 is the same as FIG. 32 except the first mask has been removed leaving first and second low resistance lead layers.

FIG. 30 is the same as FIG. 29 except a first lift off mask 308 has been formed which has openings 310 and 312 at first and second low resistance lead layer sites. These openings are recessed from a back edge of a read sensor site which will be explained in more detail hereinafter. FIG. 31 is the same as FIG. 30 except ion milling has been implemented to remove read sensor materials (SV) in the first and second low resistance lead layer sites 310 and 312. This causes the first gap layer (G1) to be exposed at the first and second lead sites 310 and 312. FIG. 32 is the same as FIG. 31 except low resistance lead layer material (LII) has been deposited in the first and second lead layer sites 310 and 312. FIG. 33 is the same as FIG. 32 except the first mask 308 has been removed leaving first and second low resistance lead layers 314 and 316 surrounded by lead sensor material (SV).

Figure 34:
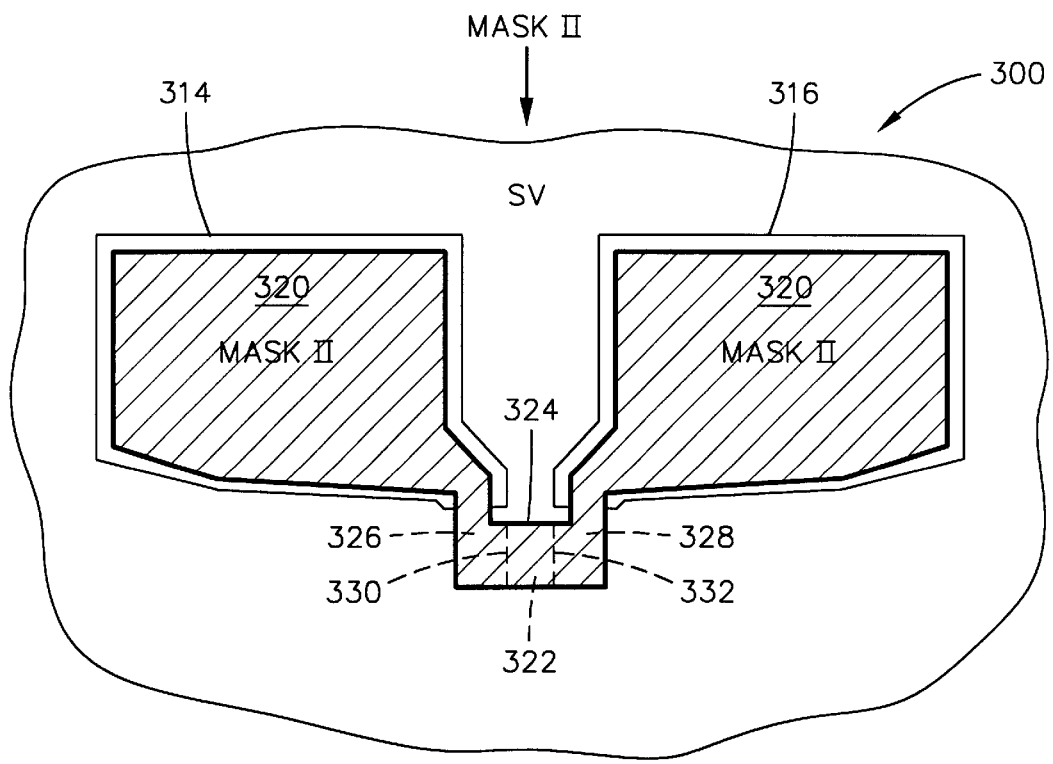
FIG. 34 is the same as FIG. 33 except a second mask has been formed covering the first and second low resistance lead layers and a read sensor site.

FIG. 34 is the same as FIG. 33 except a second mask 320 has been formed which covers the first and second low resistance lead layers 314 and 316 except for a slight peripheral edge thereof Accordingly, the mask 320 is slightly smaller than the first and second lead layers 314 and 316 so that in a subsequent ion milling step there is assurance of complete removal of the read sensor material (SV) therearound. The mask 320 also covers a read sensor site 322 with an outer edge of the mask located at a back edge site 324 of the read sensor site 322. The location of the back edge 324 is important for defining the stripe height of the sensor which establishes the magnetics of the read sensor in the read head circuit. When the read sensor is lapped to the ABS, the distance between the ABS and the edge 324 is the stripe height. The mask 320 further covers read sensor material layer portions 326 and 328 on each side of the read sensor site 322. This is necessary for making contiguous junctions at first and second side edge sites 330 and 332 of the read sensor with first and second high resistance lead layers which will be described in more detail hereinafter.

Figure 35:
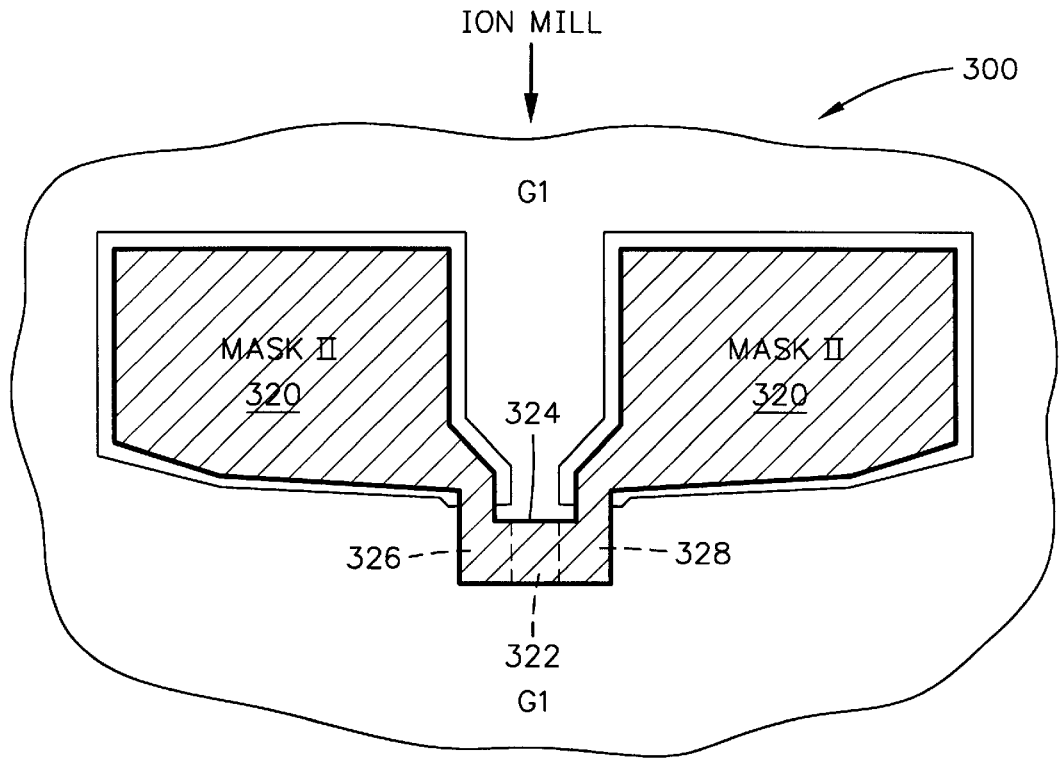
FIG. 35 is the same as FIG. 34 except milling has been implemented to define a back edge of the read sensor.
Figure 36:
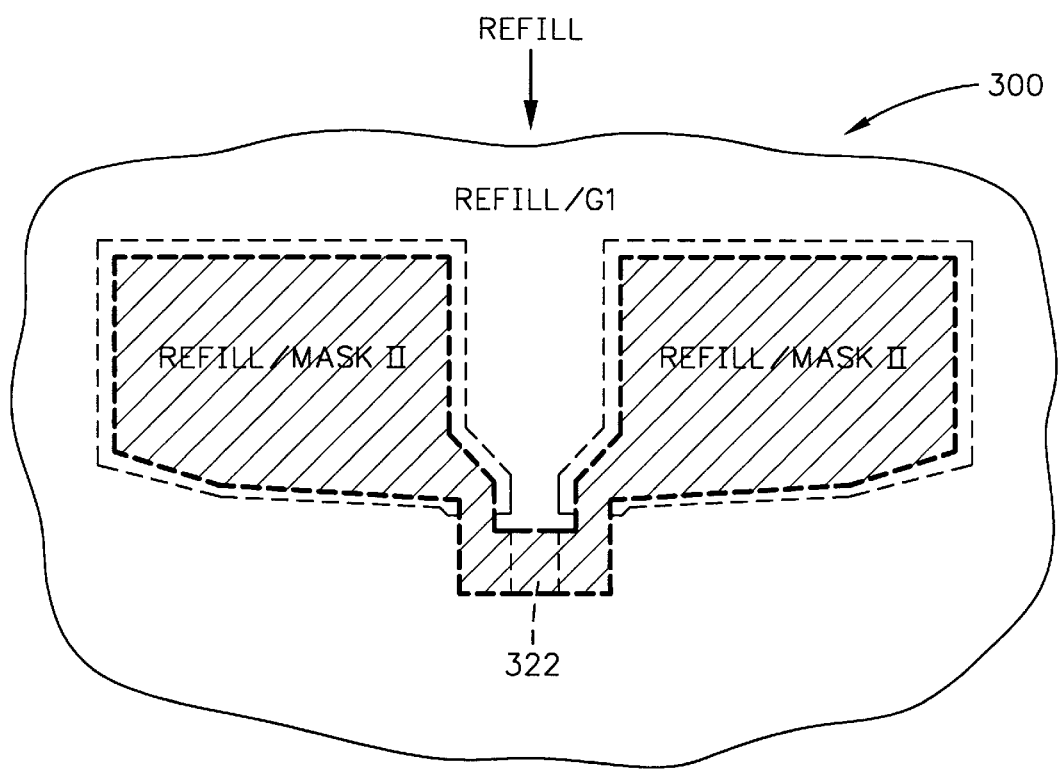
FIG. 36 is the same as FIG. 35 except a refill insulation layer has been deposited.
Figure 37:
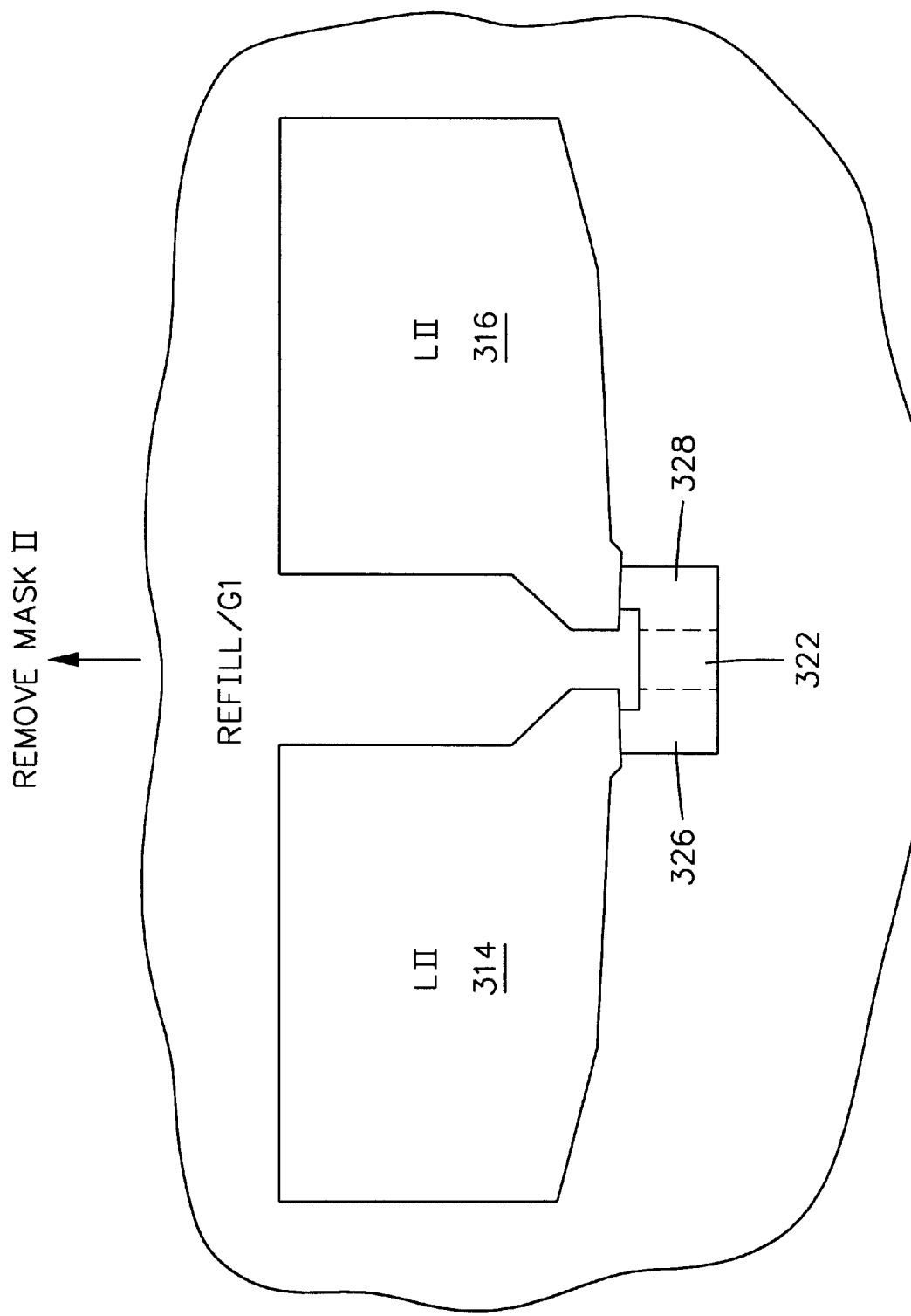
FIG. 37 is the same as FIG. 36 except the second mask has been removed leaving the first and second low resistance lead layers with refill material therearound.

FIG. 35 is the same as FIG. 34 except ion milling is implemented to remove all sensor material (SV) not covered by the mask 320. This ion milling forms the back edge 324 which is the aforementioned stripe height of the read head. In FIG. 36 an insulation refill material is deposited in order to protect the first gap layer, which is typically aluminum oxide ($Al_2O_3$) from damage from a developer, typically an alkaline based material, during the next (third) masking layer process. Further, the insulation refill material covers the first gap layer portions. opened by the next (third mask) and is preferably a thickness so that it will be completely consumed at the same time that unwanted read sensor material adjacent thereto is consumed. In FIG. 37 the second mask is removed leaving read sensor material at the read sensor site 322 and the adjacent read sensor material layer portions 326 and 328. The read sensor site 322, the portions 326 and 328 and the first and second low resistance lead layers 314 and 316 are now surrounded by refill insulation material.

Figure 38:
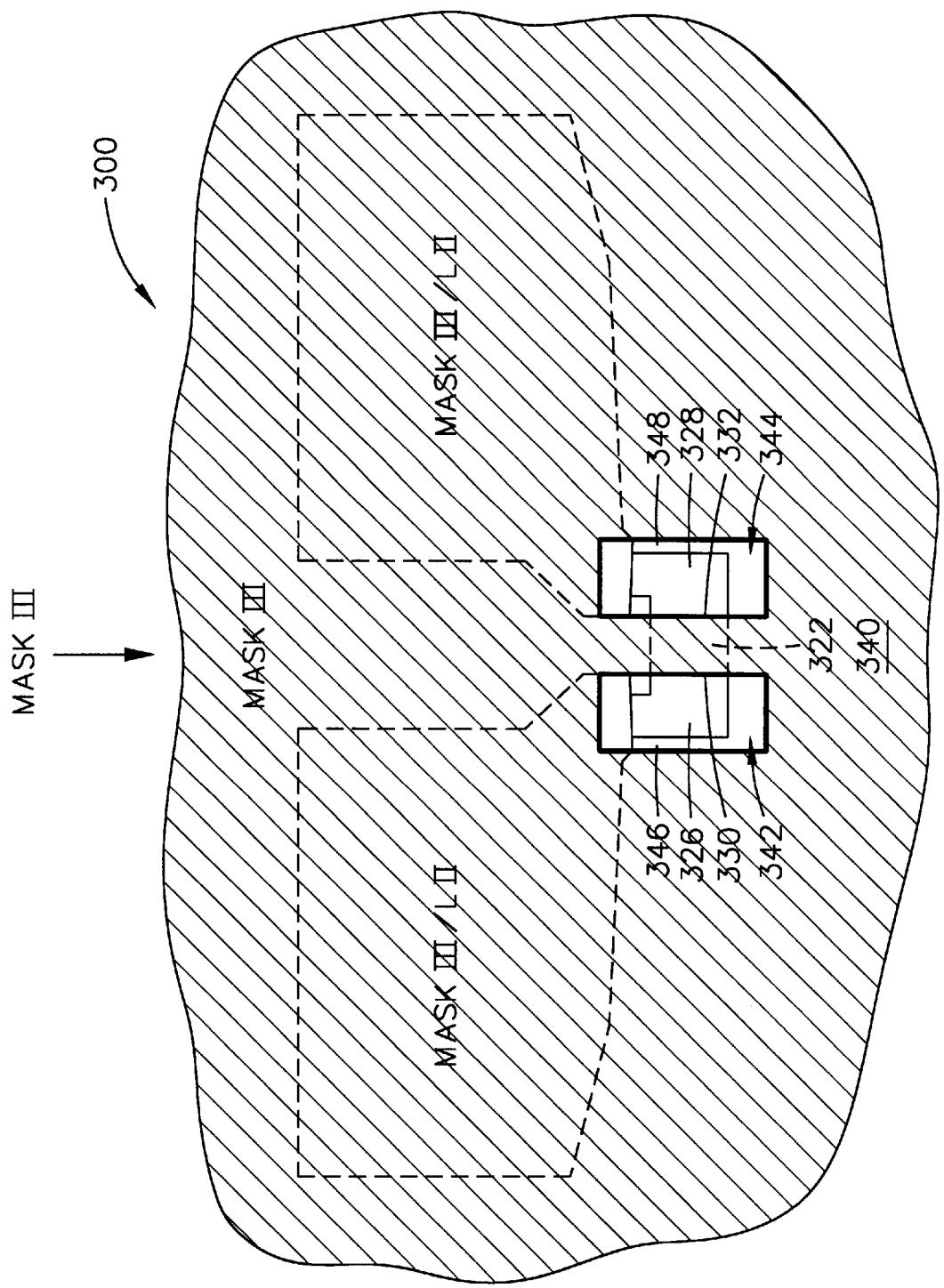
FIG. 38 is the same as FIG. 37 except a third mask has been formed with first and second openings at high resistance lead layer sites.

FIG. 38 is the same as FIG. 37 except a third mask 340 has been formed with openings 342 and 344 at first and second high resistance lead layer sites. Each opening has an inside edge which is adjacent a respective one of the first and second side edge sites 330 and 332 of the sensor 322. After ion milling, these inside edges will establish the track width of the sensor site 322. The openings 342 and 344 expose unwanted read sensor material portions 326 and 328, as well as refill material layer portions 346 and 348 adjacent thereto. As stated hereinabove the refill material layer portions 346 and 348 were deposited to protect the very thin first gap layer (G1) thereunder. It should be the refill material layer portions 346 and 348 are selected so that they are resistant to developer (potassium hydroxide base) which is employed in removing light exposed portions of the third mask 340. The refill material layer portions 346 and 348 protect the first gap layer in (G1) from ion milling which is implemented in the next step. The refill material may be $C_2$, $SiO_2$ or NiO.

Figure 39:
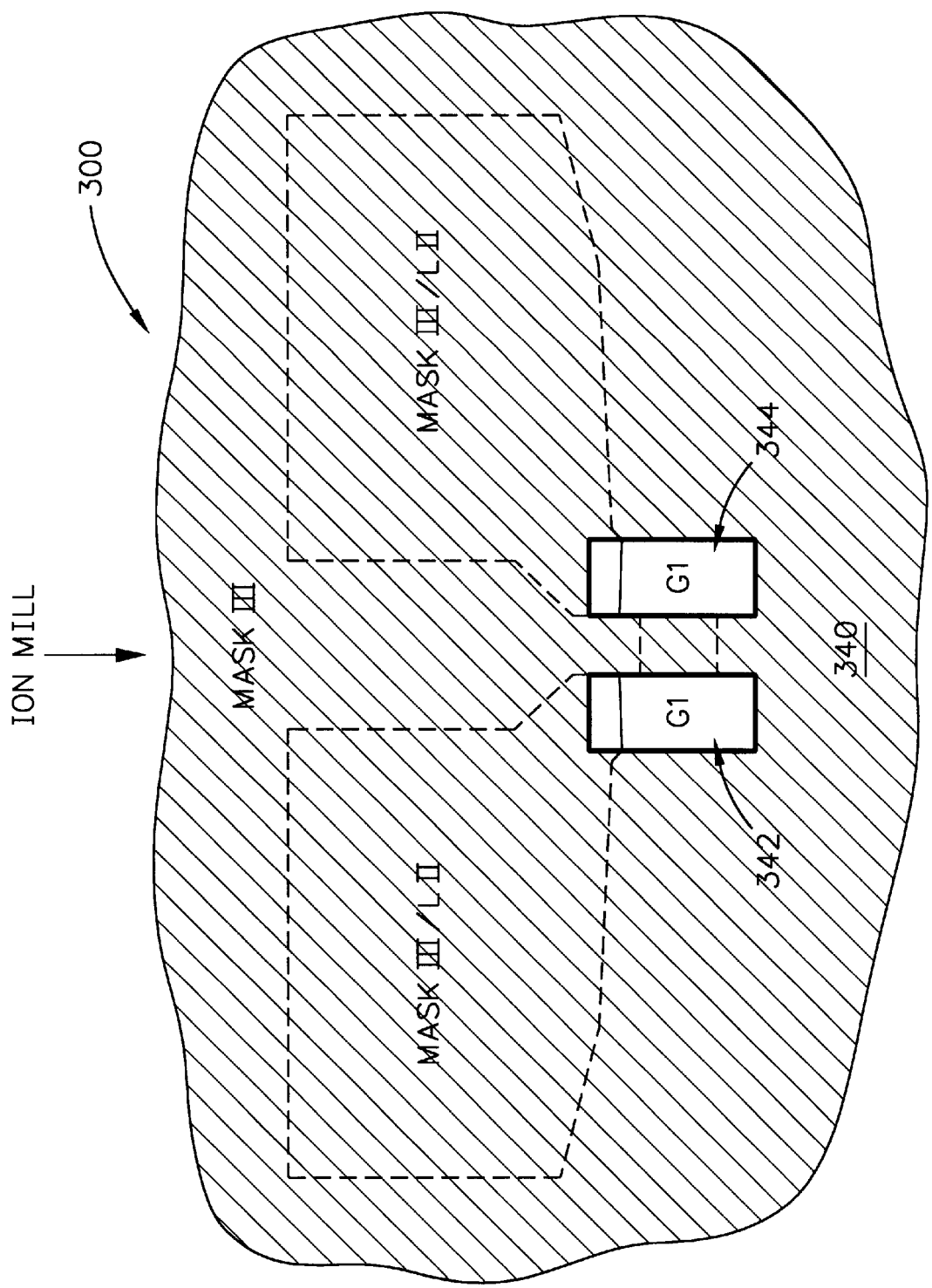
FIG. 39 is the same as FIG. 38 except material within the openings of the first and second high resistance lead layer sites has been milled away.

In FIG. 39 the unwanted read sensor material layer portions 342 and 344 and the refill material insulation layer portions 346 and 348 (see FIG. 38) are milled away to expose the first gap layer (G1) within the openings 342 and 344. It should be noted that the refill layer insulation portions 346 and 348 protected the first gap layer (G1) during this ion milling operation. It is preferred that the type of material and thickness of the refill insulation material layer be chosen so that it is consumed simultaneously with the consumption of the unwanted read sensor material layers 326 and 328 by the ion milling in FIG. 39. This can be easily accomplished by comparing the milling rates of the read sensor and refill material layers and then adjusting the thickness of the refill material layer accordingly. It should also be noted that had the refill material insulation layer portions 346 and 348, as shown in FIG. 38, not been deposited that the ion milling in FIG. 39 would have ion milled the first gap layer (G1) at 346 and 348.

Figure 40:
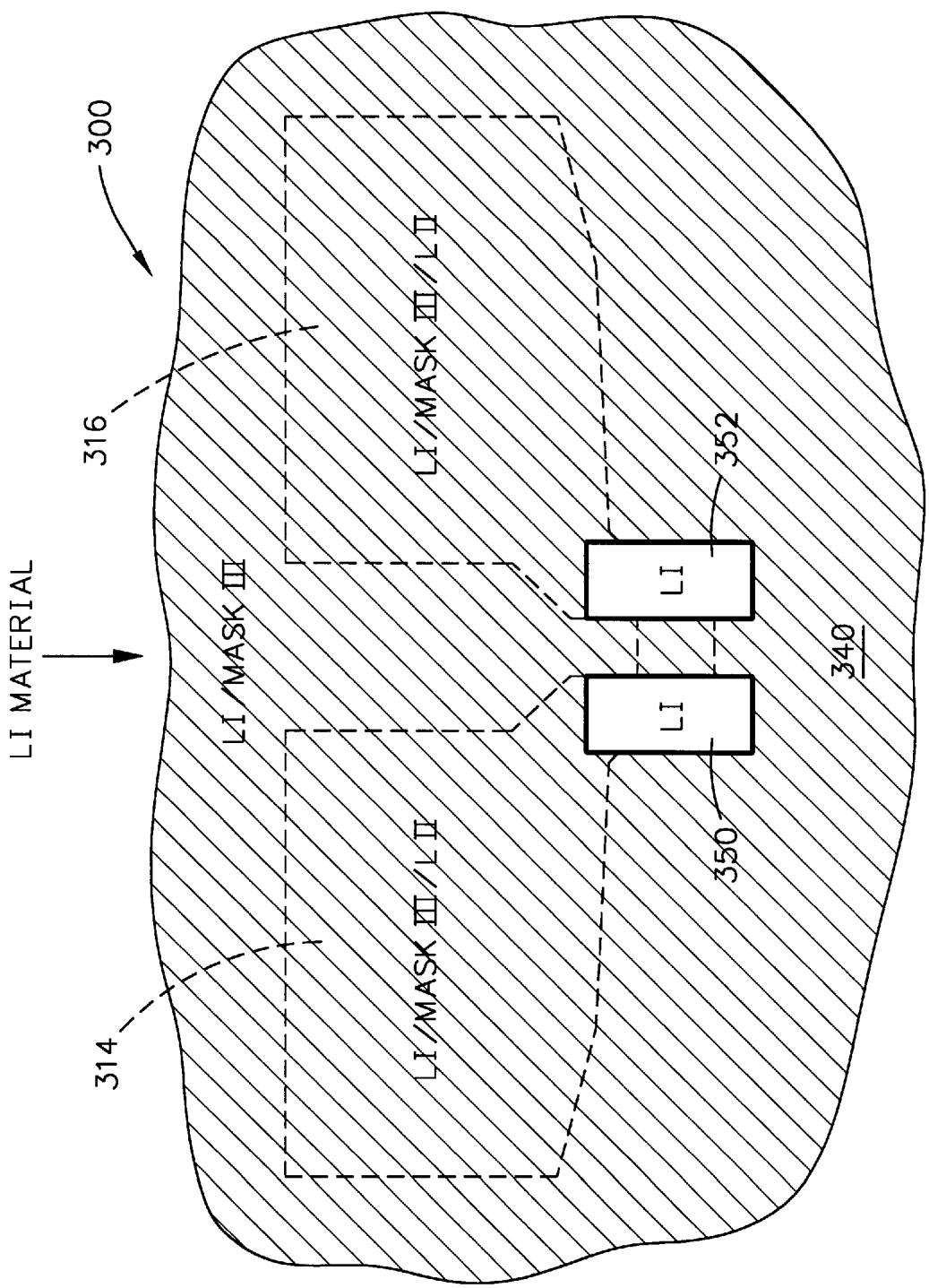
FIG. 40 is the same as FIG. 39 except high resistance lead layer material has been deposited.
Figure 41:
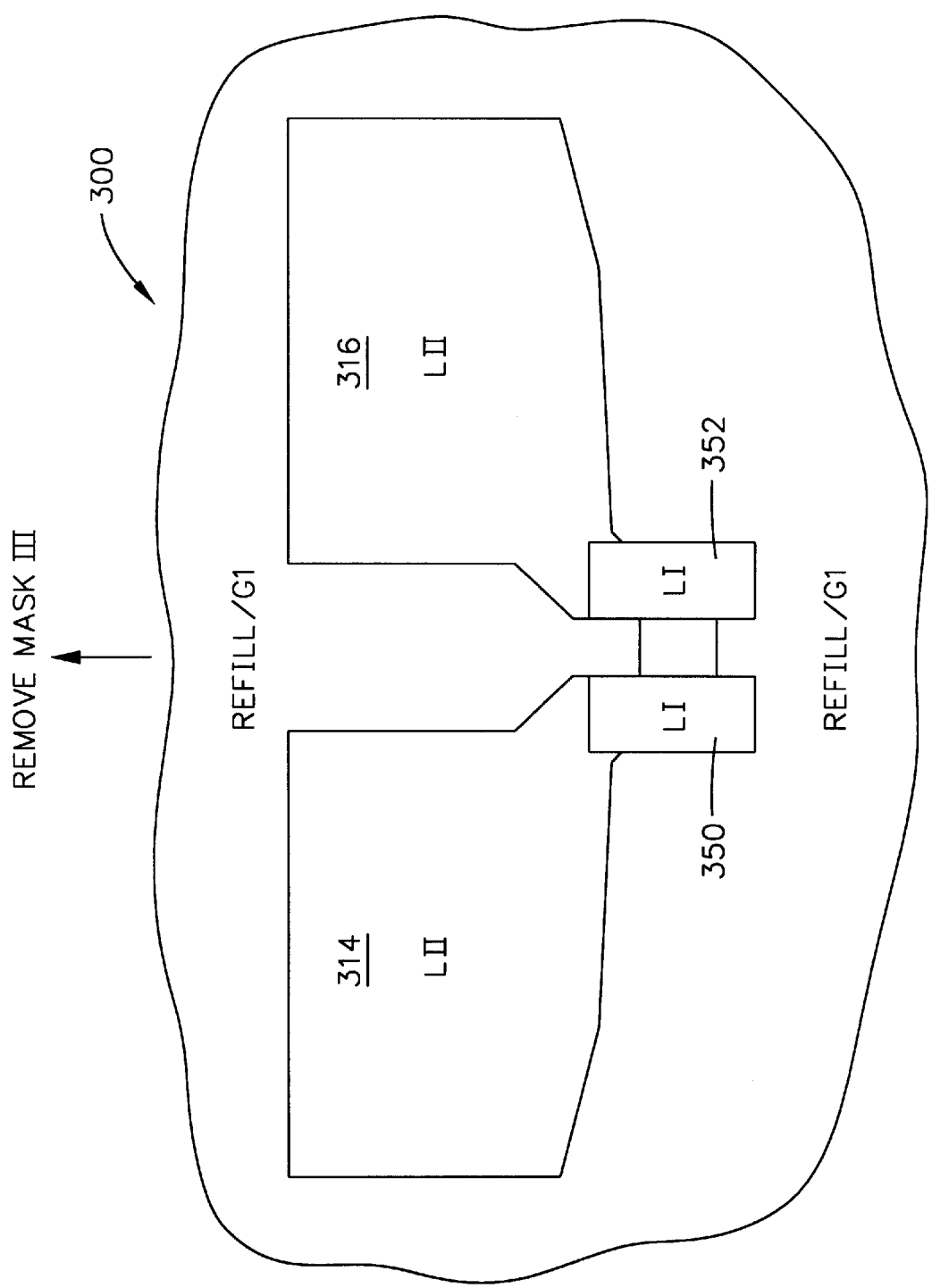
FIG. 41 is the same as FIG. 40 except the third mask has been removed.
Figure 42:
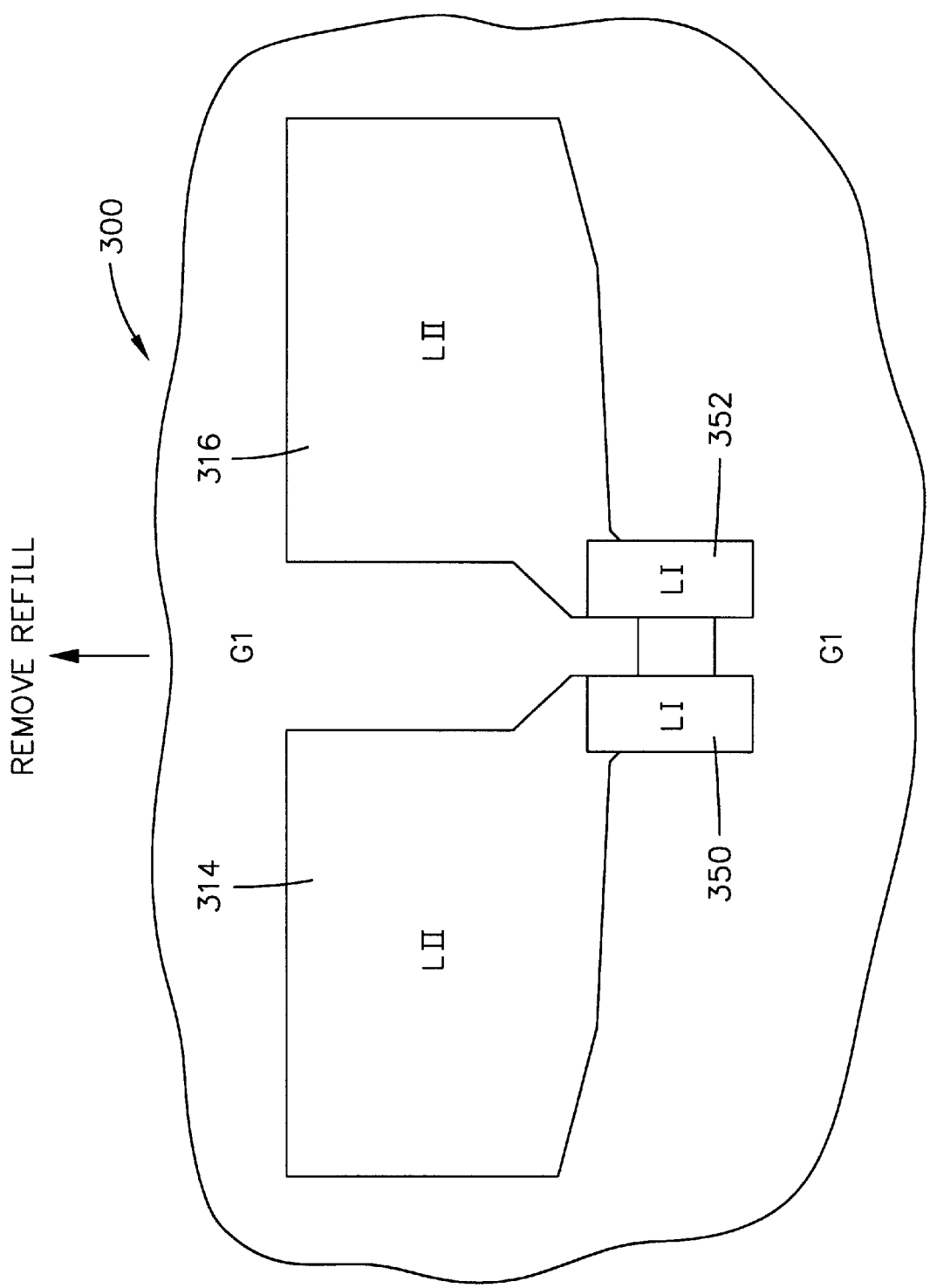
FIG. 42 is the same as FIG. 41 except the refill insulation material has been removed.
Figure 43:
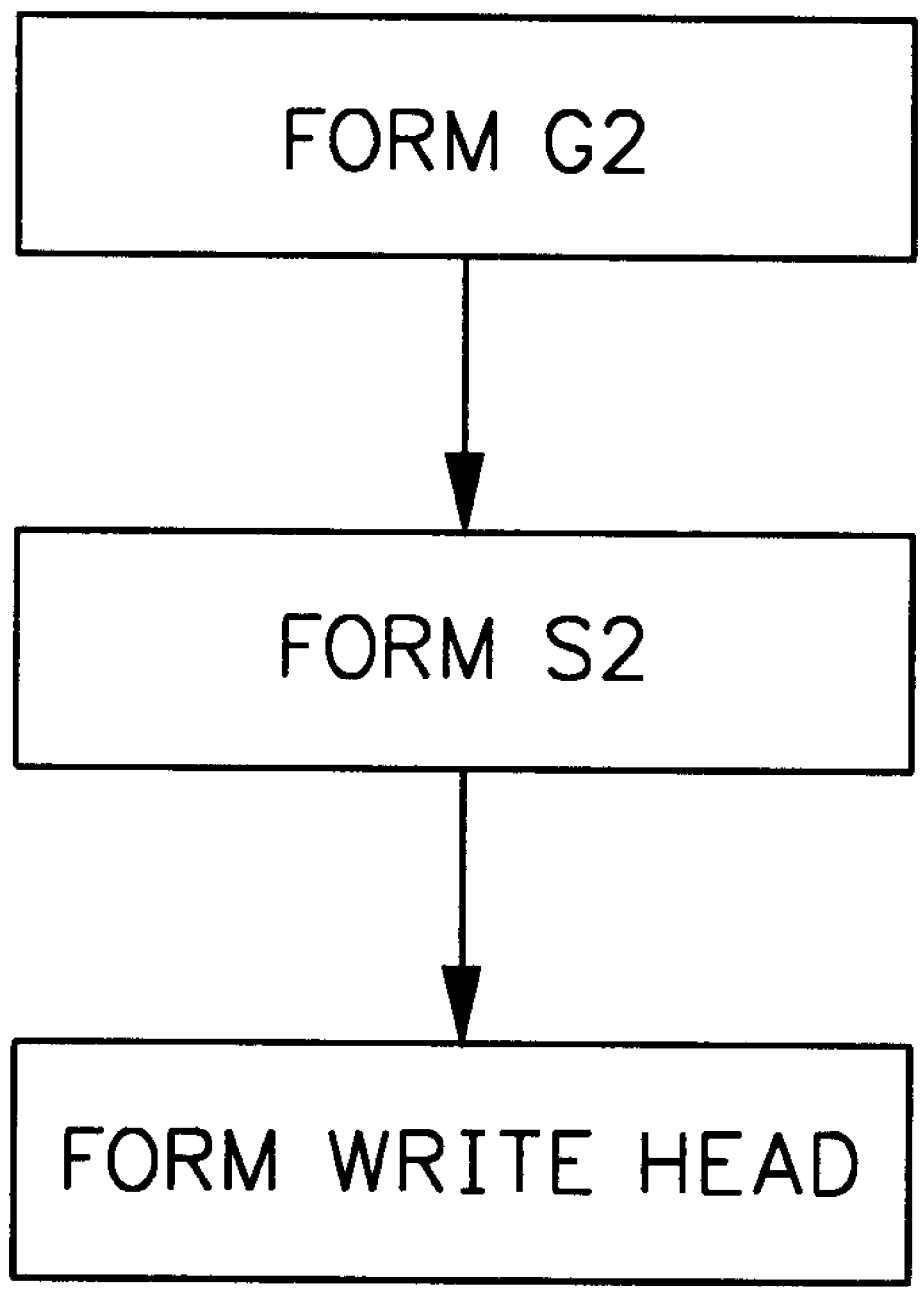
FIG. 43 is a block diagram of steps in the method for completing the construction of the read head.

FIG. 40 is the same as FIG. 39 except high resistance lead layer material has been deposited in the openings of the third mask 340 to form first and second high resistance lead layers 350 and 352 which partially overlap the first and second low resistance lead layer portions 314 and 316 for electrical connection thereto. If desired, the high resistance lead layers 350 and 352 can completely overlap the low resistance lead layers 314 and 316. In FIG. 41 the third mask 340 is removed leaving the first and second high resistance lead layers 350 and 352 and the first and second low resistance lead layers 314 and 316 surrounded by refill insulation material. In FIG. 42 the refill insulation material may be removed by a selective process, such as chemical or reactive ion etching, exposing the first gap layer (G1). Thereafter the second gap layer (G2), the second shield layer (S2) and a write head may be formed, as shown in FIG. 43, to complete a merged head as shown in FIGS. 7 and 12.

Clearly, other embodiments and modifications of this invention will readily occur to those of ordinary skill in the art upon reading these teachings. Therefore, this invention is to be limited only by the following claims, which include all such embodiments and modifications when viewed in conjunction with the above specification and accompanying drawings.

We claim:

1. A magnetic head that has a head surface for facing a magnetic medium, comprising:

a read sensor bounded by the head surface, first and second side edges and a back edge;

first and second leads wherein each lead has a high resistance lead layer and a low resistance lead layer wherein the high resistance lead layer is composed of a material which has a resistance that is greater than a resistance of a material of the low resistance lead layer;

first and second gap layers;

the read sensor and the first and second leads being sandwiched between the first and second gap layers;

each high resistance lead layer being partially bounded by the head surface and first and second side edges and each low resistance lead layer being partially bounded by a front edge that is recessed from the head surface and first and second side edges;

the first side edge of the high resistance lead layer of the first and second leads abutting the first and second side edges respectively of the read sensor and electrically connected thereto; and substantially all of each high resistance lead layer between its first and second side edges adjacent a respective side edge of the read sensor extending in a direction perpendicular to the head surface and making electrical contact with a respective low resistance lead layer.

2. A magnetic head as claimed in claim 1, wherein a lateral width of each high resistance lead layer along said head surface and a thickness thereof are chosen so as to minimize the thickness while optimizing an electrical resistance thereof.

3. A magnetic head as claimed in claim 1, including:

each low resistance lead layer being sandwiched between the first gap layer and a respective high resistance lead layer and engaging the respective high resistance lead layer so as to be electrically connected thereto; and the high resistance lead layers being more corrosion resistant than the low resistance lead layers.

4. A magnetic head as claimed in claim 3, wherein a lateral width of each high resistance lead layer along said head surface and a thickness thereof are chosen so as to minimize the thickness while optimizing an electrical resistance thereof.

5. A magnetic head as claimed in claim 4, wherein each high resistance lead layer is Ta and each low resistance lead layer is Au or Cu.

6. A magnetic head as claimed in claim 3 wherein the high resistance lead layers of the first and second leads overlay the low resistance lead layers of the first and second leads respectively.

7. A magnetic disk drive that includes at least one merged magnetic head assembly that has a head surface for facing a magnetic medium, the disk drive comprising:

the merged magnetic head having a read head portion that includes:
- a read sensor bounded by the head surface, first and second side edges and a back edge;
- first and second leads wherein each lead has a high resistance lead layer and a low resistance lead layer;
- first and second shield layers;
- first and second gap layers which interface the first and second shield layers respectively;
- the read sensor and the first and second leads being sandwiched between the first and second gap layers;
- each high resistance lead layer being partially bounded by the head surface and first and second side edges and each low resistance lead layer being partially bounded by a front edge that is recessed from the head surface and first and second side edges;
- the first side edge of the high resistance lead layer of the first and second leads abutting the first and second side edges respectively of the read sensor and electrically connected thereto; and
- substantially all of each high resistance lead layer between its first and second side edges adjacent a respective side edge of the read sensor extending in a direction perpendicular to the head surface and making electrical contact with a respective low resistance lead layer;

the merged magnetic head having a write head portion that includes:
- first and second pole piece layers wherein the first pole piece layer is a common layer with the second shield layer;
- a write gap layer;
- the first and second pole piece layers being separated by the write gap layer at the head surface and connected at a back gap;
- an insulation stack including a plurality of insulation layers and at least one coil layer embedded therein; and
- the insulation stack being sandwiched between the first and second pole piece layers and located between the head surface and the back gap;

a housing;

a magnetic medium supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

8. A magnetic disk drive as claimed in claim 7, wherein a lateral width of each high resistance lead layer along said head surface and a thickness thereof are chosen so as to minimize the thickness while optimizing an electrical resistance thereof.

9. A magnetic disk drive as claimed in claim 7, including:
- each low resistance lead layer being sandwiched between the first gap layer and a respective high resistance lead layer and engaging the respective high resistance lead layer so as to be electrically connected thereto; and
- the high resistance lead layers being more corrosion resistant than the low resistance lead layers.

10. A magnetic disk drive as claimed in claim 9, wherein a lateral width of each high resistance lead layer along said head surface and a thickness thereof are chosen so as to minimize the thickness while optimizing an electrical resistance thereof.

11. A magnetic disk drive as claimed in claim 10, wherein each high resistance lead layer is Ta and each low resistance lead layer is Au or Cu.

12. A magnetic disk drive as claimed in claim 9 wherein the high resistance lead layers of the first and second leads overlay the low resistance lead layers of the first and second leads respectively.

* * * * *